United States Patent
Maxwell et al.

(10) Patent No.: US 12,485,409 B2
(45) Date of Patent: Dec. 2, 2025

(54) METHODS AND SYSTEMS FOR PHOTO-ACTIVATED HYDROGEN GENERATION

(71) Applicant: BOMAX Hydrogen LLC, Merritt Island, FL (US)

(72) Inventors: Deborah B. Maxwell, Merritt Island, FL (US); Deidra L. Gerlach, Merritt Island, FL (US)

(73) Assignee: BOMAX Hydrogen LLC, Merritt Island, FL (US)

( * ) Notice: Subject to any disclaimer, the term of this patent is extended or adjusted under 35 U.S.C. 154(b) by 1399 days.

(21) Appl. No.: 16/979,916

(22) PCT Filed: Mar. 13, 2019

(86) PCT No.: PCT/US2019/021991
§ 371 (c)(1),
(2) Date: Sep. 11, 2020

(87) PCT Pub. No.: WO2019/178189
PCT Pub. Date: Sep. 19, 2019

(65) Prior Publication Data
US 2021/0008532 A1    Jan. 14, 2021

Related U.S. Application Data

(60) Provisional application No. 62/642,401, filed on Mar. 13, 2018.

(51) Int. Cl.
*B01J 35/39*    (2024.01)
*B01J 27/057*    (2006.01)
(Continued)

(52) U.S. Cl.
CPC ........... *B01J 35/39* (2024.01); *B01J 27/0573* (2013.01); *B01J 31/0229* (2013.01); *B01J 31/22* (2013.01);
(Continued)

(58) Field of Classification Search
CPC ........ B01J 31/22; B01J 27/0573; B01J 35/39; B01J 35/50
(Continued)

(56) References Cited

U.S. PATENT DOCUMENTS

| 9,605,269 B2 | 3/2017 | Sillers et al. | |
| 2007/0137998 A1* | 6/2007 | Sykora | H01G 9/20 204/157.15 |

(Continued)

FOREIGN PATENT DOCUMENTS

IN    201641006075 A    8/2017

OTHER PUBLICATIONS

Brown, A. K., et al. "Light-driven dinitrogen reduction catalyzed by a CdS: nitrogenase MoFe protein biohybrid." Science 352.6284 (2016): 448-450 (Year: 2016).*

(Continued)

*Primary Examiner* — James Lin
*Assistant Examiner* — John Lee
(74) *Attorney, Agent, or Firm* — Scott Goncher; Greenberg Traurig, LLP

(57) ABSTRACT

Systems and methods for providing alternative fuel, in particular hydrogen photocatalytically generated by a system comprising photoactive nanoparticles and a nitrogenase cofactor are provided. In one aspect, the system includes a water soluble cadmium selenide nanoparticle (CdSe) surface capped with mercaptosuccinate (CdSe-MSA) and a NafY.FeMo-co complex comprising a NafY protein and an iron-molybdenum cofactor (FeMo-co), wherein the CdSe- (Continued)

MSA and NafY·FeMo-co complex are present in about 1:2 to 1:10 molar ratio.

14 Claims, 29 Drawing Sheets

(51) Int. Cl.
 *B01J 31/02* (2006.01)
 *B01J 31/22* (2006.01)
 *B01J 35/45* (2024.01)
 *C01B 3/00* (2006.01)

(52) U.S. Cl.
 CPC ............ *B01J 35/45* (2024.01); *B01J 2235/00* (2024.01); *B01J 2235/05* (2024.01); *B01J 2235/10* (2024.01); *B01J 2235/30* (2024.01)

(58) Field of Classification Search
 USPC .................................................. 204/157.52
 See application file for complete search history.

(56) References Cited

U.S. PATENT DOCUMENTS

| | | | |
|---|---|---|---|
| 2008/0302669 A1 | 12/2008 | Peters et al. | |
| 2015/0225742 A1* | 8/2015 | Maxwell | C12P 3/00 435/189 |
| 2016/0024664 A1* | 1/2016 | Krauss | C25B 1/02 422/186.04 |
| 2018/0037911 A1* | 2/2018 | Maxwell | C12Y 118/06001 |
| 2018/0142264 A1* | 5/2018 | King | C12N 9/0095 |

OTHER PUBLICATIONS

Maxwell, "Iron Molybdenum Cofactor: Catalyst in Dihydrogen Production and Nifen's Role in the FeMo-co Biosynthetic Pathway" (2012). Electronic Theses and Dissertations. 2441. (Year: 2012).*

Brown et al., "Characterization of photchemcial processes for H2 production by CdS nanorod-[FeFe] Hydrogenase complexes," Journal of the American Chemical Society, 2012, vol. 134, pp. 5627-5636.

Burgess et al., "Large-scale purification of high activity Azotobacter vinelandii nitrogenase," Biochimica et Biophysica Acta, 1980, vol. 614, pp. 196-209.

Callan et al., "Luminescent detection of ATP in aqueous solution using positively charged CdSe—ZnS quantum dots," Journal of Fluorescence, 2008, vol. 18, pp. 1157-1161.

Cheney et al., "Some metal chelates of mercaptosuccinic acid," 1959. Doctoral Thesis. University of Pittsburgh, pp. 2055-2057.

Christiansen et al, "Catalytic and biophysical properties of a nitrogenase Apo-MoFe protein produced by a nifB-deletion mutant of Azotobacter vinelandii," Biochemistry, 1998, vol. 37, pp. 12611-23.

Junge et al., "Light to Hydrogen: photocatalytic hydrogen generation from water with molecularly-defined iron complexes," Inorganics, 2017, vol. 5, No. 14, pp. 1-21.

King, Paul, "Designing interfaces of hydrogenase-nanoparticle hybrids for efficient solar conversion," Biochimica et Biophysica Acta, 2013, vol. 1827, pp. 949-957.

Kylie et al., "Investigating and exploiting the electrocatalytic properties of hydrogenase, " Chemical Reviews, 2007, vol. 107, pp. 4366-4413.

Mayhew, S.G., "The redox potential of dithionite and 50-2 from equilibrium reactions with flavodoxins, methyl viologen and hydrogen plus hydrogenase," European Juornal of Biochemistry, 1978 vol. 85, pp. 535-547.

McLean et al., "A new method for extraction of iron-molybdenum cofactor (FeMoco) from nitrogenase adsorbed to DEAE-cellulose. 1. Effects of anions, cations, and preextraction treatments," Nov. 28, 1989, vol. 28, No. 24, pp. 9402-9406.

Melis et al., "Hydrogen production: green algae as a source of energy," Plant Physiology, 2001, vol. 127, pp. 740-748.

Reisner et al., "Visible Light-Driven H2 Production by Hydrogenases Attached to Dye-Sensitized TiO2 Nanoparticles," 2009, vol. 131, No. 51, pp. 1457-18466.

Shah et al., "Isolation of an iron-molybdenum cofactor from nitrogenase," Proceedings of the National Academy of Sciences, 1977, vol. 74, pp. 3249-3253.

Wilker et al.,"Electron Kinetics in CdS Nanorod-[FeFe]-Hydrogenase Complexes and Implications for Photochemical H2 Generation," Journal of the American Chemical Society, 2014, vol. 136, pp. 4316-4324.

www.cafcp.org/blog; www.cafcp.org/blog/32nd-hydrogen-station-opens-mountain-view-california, Feb. 27, 2018.

www.caranddriver.com/news/honda-fcev-concept-news, Nov. 21, 2013.

www.hypersolar.com/technology.php.

www.money.cnn.com/2017/09/11/autos/countries-banning-diesel-gas-cars/index.html, Sep. 11, 2017.

www.popsci.com/how-hydrogen-vehicles-work, Apr. 15, 2015.

https://energyfactor.exxonmobil.com/reducing-emissions/algae-heading-farm/, 2018.

International Search Report in International Application No. PCT/US2019/021991 mailed on May 8, 2019.

* cited by examiner

METHODS AND SYSTEMS FOR PHOTO-ACTIVATED HYDROGEN GENERATION

CROSS-REFERENCE TO RELATED APPLICATIONS

This application is a U.S. National Phase application under 35 U.S.C. 371 of International Application No. PCT/US2019/021991, filed Mar. 13, 2019, which claims the benefit of and priority to U.S. Provisional Application No. 62/642,40 filed Mar. 13, 2018, the entire disclosure of each of which is incorporated herein by reference.

FIELD

The present disclosure relates in general to systems and methods for providing alternative fuel, in particular hydrogen photocatalytically generated by a system comprising photoactive nanoparticles and a nitrogenase cofactor.

BACKGROUND

The worldwide demand for hydrogen as a green energy carrier source grows larger with each passing year. Major auto manufacturers have developed affordable car models run by hydrogen fuel cells such as the Toyota Mirai and the Honda Clarity (1,2). Several U.S. states have adopted hydrogen highway initiatives with California leading the way (3). Numerous countries in the EU and elsewhere have banned sales of internal combustion engines in the next 10 to 15 years (4).

Sustainable hydrogen generating systems that are on-site at point of use are attractive economically and environmentally as alternative methods to the most predominant hydrogen producing method of steam methane reforming (5). Thus, a need exists for improved systems and methods for producing hydrogen.

SUMMARY

In one aspect, provided herein is a system for photocatalytically producing hydrogen gas, comprising a water soluble cadmium selenide nanoparticle (CdSe) surface capped with mercaptosuccinate (CdSe-MSA) and a NafY·FeMo-co complex comprising a NafY protein and an iron-molybdenum cofactor (FeMo-co), wherein the CdSe-MSA and NafY·FeMo-co complex are present in about 1:2 to 1:10 molar ratio.

In some embodiments, the CdSe-MSA and the NafY·FeMo-co complex can be present in about 1:2, 1:3, 1:4 or 1:5 molar ratio.

In some embodiments, the system can further include sodium dithionite for providing protons and electrons. In some embodiments, the dithionite salt is provided at a concentration of about 2 mM to 1 M, or about 2-100 mM, or about 2-10 mM. In certain embodiments, the system can further include an additional proton source such as ascorbic acid, acetic acid, citric acid, and carbon dioxide.

In some embodiments, the system is capable of photocatalytically producing hydrogen gas for an extended period of about 5-90 days, 10-72 days or 39-72 days.

In various embodiments, the system is kept under anaerobic conditions. The NafY protein can be derived from *Azotobacter vinelandii*. The FeMo-co can be derived from a molybdenum-iron (MoFe) protein. The MoFe protein can be derived from *Azotobacter vinelandii*.

In another aspect, provided herein is a method for producing hydrogen gas, comprising illuminating the system disclosed herein with a light source having a peak wavelength of about 400-525 nm. In some embodiments, the peak wavelength is about 425 nm. In some embodiments, the peak wavelength is about 460 nm. In some embodiments, the light source has an intensity of about 18,000 to 1,200,000 lux, or about 50,000 to 800,000 lux.

In a further aspect, provided herein is a method for producing hydrogen gas, comprising illuminating a system with a light source having a peak wavelength of about 400-525 nm, wherein the system comprises a water soluble cadmium selenide nanoparticle (CdSe) surface capped with mercaptosuccinate (CdSe-MSA) and a NafY·FeMo-co complex comprising a NafY protein and an iron-molybdenum cofactor (FeMo-co).

In some embodiments, the peak wavelength is about 425 nm or about 460 nm. In some embodiments, the light source has an intensity of about 18,000 to 1,200,000 lux, or about 50,000 to 800,000 lux.

In some embodiments, the CdSe-MSA and NafY·FeMo-co complex are present in about 1:1 or lower molar ratio, e.g., ranging from about 1:2 to about 1:10. In some embodiments, the CdSe-MSA and the NafY·FeMo-co complex are present in about 1:2, 1:3, 1:4 or 1:5 molar ratio.

In some embodiments, the system further comprises sodium dithionite for providing protons and electrons. In some embodiments, the dithionite salt is provided at a concentration of about 2 mM to 1 M, or about 2-100 mM, or about 2-10 mM. In certain embodiments, the system further comprises an additional proton source such as ascorbic acid, acetic acid, citric acid, and carbon dioxide.

In various embodiments, the system is capable of photocatalytically producing hydrogen gas for an extended period of about 5-90 days, 10-72 days or 39-72 days.

BRIEF DESCRIPTION OF THE DRAWINGS

FIG. 19A plots total hydrogen vs days since setup and FIG. 19B plots total hydrogen vs days of light.

FIG. 20A plots total hydrogen vs days of light where the samples returned to light after 53 days of darkness were relabeled with a prime (') and Day 54 is plotted as a new Day 1 of light. FIG. 20B plots the extrapolated rate of hydrogen generation vs days of light.

FIG. 21B show the spectra of the samples kept in the dark for the full duration. On Day 12, the dark samples were put in the light and labeled as Day0' as an analogous setup time stamp. FIG. 21C shows that the spectra for the samples which started with 12 days of darkness then given light exposure maintained absorbance for 9 days in the light.

FIG. 22A is a plot of total hydrogen produced vs days of light, and FIG. 22B is extrapolated rate of hydrogen generation vs days of light.

FIG. 23A plots total hydrogen produced vs days since setup with days of darkness included; whereas, FIG. 23B plots total hydrogen produced vs days of light exposure.

FIG. 24A plots total hydrogen produced vs days since setup with days of darkness included; whereas, FIG. 24B plots total hydrogen produced vs days of light exposure.

FIG. 25A plots total hydrogen produced vs days since setup with days of darkness included; whereas, FIG. 25B plots total hydrogen produced vs days of light exposure. FIG. 25C plots extrapolated rate of hydrogen generation vs days of light exposure.

DETAILED DESCRIPTION

Figure 1:
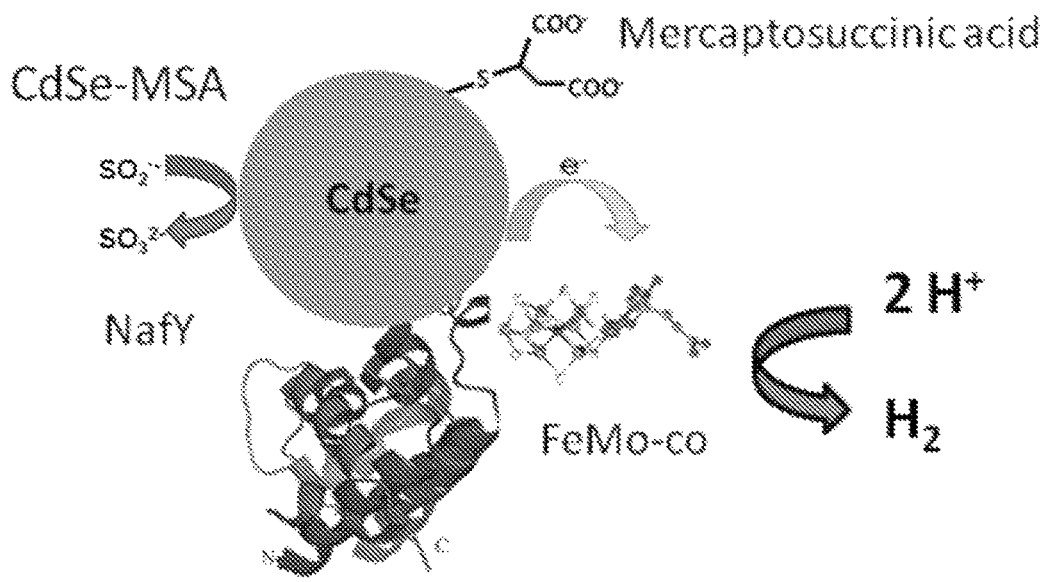
FIG. 1. Graphic showing the components of the exemplary hydrogen generation samples. CdSe (2 µM) capped with mercaptosuccinic acid complexed with NafY-FeMo-co (2 µM). Sacrificial electron donor ($Na_2S_2O_4$) is present at 2 mM concentration.

Unless otherwise defined, all technical and scientific terms used herein have the same meaning as commonly understood by one of ordinary skill in the art to which this disclosure belongs. Methods and materials are described herein for use in the present disclosure; other, suitable methods and materials known in the art can also be used. The materials, methods, and examples are illustrative only and not intended to be limiting. All publications, patent applications, patents, database entries, and other references mentioned herein are incorporated by reference in their entirety. In case of conflict, the present specification, including definitions, will control.

As used herein, the articles "a" and "an" are used herein to refer to one or to more than one (i.e., to at least one) of the grammatical object of the article. By way of example, "an element" means one element or more than one element.

As used herein, the term "about" means within 20%, more preferably within 10% and most preferably within 5%.

"Peak wavelength" means the wavelength at which the optical power of a source is at maximum.

The present disclosure relates to a catalytic system that can harness solar energy and produce an alternative fuel will be the paramount challenge of this new century. Indeed by its end the most widely used fossil fuel, petroleum, may have run dry. Several catalytic systems have been reported in scientific literature that utilizes both natural products and man-made components. Some of the hybrid systems use hydrogenase, an enzyme that both reduces and oxidizes hydrogen in bacteria, either alone or in combination with photosystem I, coupled to platinum. The goal of the present disclosure was to develop a system that would use a smaller catalytic natural component along with a less expensive light harvesting semi-conductor rather than the metal platinum, which is of limited availability. Surprisingly, the system of the present disclosure displays unexpected longevity and can produce hydrogen for a prolonged period of time. Methods for making and using the system are also provided.

Photo-biocatalytic systems that generate renewable hydrogen sources are appealing for multiple reasons including because rather than using fossil fuels they tap into visible light sources to provide electrons and utilize inexpensive weak acids for feedstocks (7). Recent advances and improvements in the CdSe-NafY-FeMo-co catalytic system have achieved various advantages including, but not limited to, an on-site at point of use hydrogen delivery system with distinct commercial advantages. In embodiments, these improvements have increased hydrogen production rate, hydrogen production duration and contributed to better understanding of the catalyst in order to improve its performance. Additionally, the increase in hydrogen production rates are identified as "burst" rates that are typically observed by measurements within 24 hours of the experiment initiation.

Embodiments described herein represent improvements made to a cadmium selenide NafY protein FeMo-co catalytic system (CdSe·NafY·FeMo-co) that produces hydrogen, such as the system disclosed in U.S. Pat. No. 9,605,279, incorporated herein by reference in its entirety. (6) The improvements include surprising discoveries which enhance the commercial viability of the catalytic system.

In some embodiments, hydrogen production by the CdSe·NafY·FeMo-co system disclosed herein can be greatly enhanced by one or more of:
 illumination wavelength (e.g., peak wavelength about 400-550 nm, or about 425-525 nm, or that of blue LED or royal blue LED) and intensity (e.g., about 18,000 to 1,200,000 lux, or about 50,000 to 800,000 lux);
 availability or source of protons as feedstock (e.g., one or more of dithionite, acetic acid, ascorbic acid, citric acid, and/or carbon dioxide dissolved in water); and/or
 integrity of the components (e.g., ratio of the components to one another).

Surprisingly, the ratio of CdSe to NafY-FeMo-co has been found to have an effect on catalyst integrity and duration of hydrogen production. The samples are illuminated with LED specific wavelength in the visible light spectrum or can be illuminated with sunlight. In different embodiments the NafY-FeMo-co concentration can be varied so that the ratio between CdSe and NafY-FeMo-co can be 1:2, 1:3, 1:4 or 1:5. The higher the excess amount of NafY-FeMo-co to the CdSe results in longer sustained electronic properties and homogeneity of solution. This also directly results in lower rates of hydrogen production per CdSe loading. Higher loading of feedstock can be tolerated by the catalyst to the point that the diminished rate has been partially countered with higher feedstock loading.

Another surprising discovery is that additional excess loading of electron donor—spiking of dithionite $Na_2S_2O_4$, may over a period of time jeopardize the integrity of the catalytic system. As such, maintaining a sufficiently low concentration of dithionite and/or use of alternative or additional proton donor may be desirable. One reason hydrogen generation may have ceased was because the electron source was consumed. Spiking of the samples was done with sodium dithionite to provide more protons and electrons (because the dithionite acts both as a reductant and also reacts with water in its monomer form to produce protons); however, after several weeks of running the sample in front of the light samples, both halogen and LED lights, it was proposed that the sodium dithionite itself may have jeopardized the catalyst itself. It was proposed that the sodium dithionite may have been interacting with the nanoparticle surface leading to surface defects. Rather than photoexcited electrons participating in electron transfer to the adsorbed NafY-FeMo-co to facilitate proton reduction, the electrons may have undergone recombination. The source of protons and electrons was the reagent sodium dithionite ($Na_2S_2O_4$). Increasing concentration of this source had been shown to increase hydrogen production. Samples were "spiked" with an additional injection of sodium dithionite to bring the concentration back to 2 mM or greater on the third or fourth or fifth day. The dithionite ($S_2O_4^{-2}$), a dimer, is known to be in equilibrium with its monomer form ($SO_2^{-}$), a sulfur dioxide radical. It is this monomer that reacts with the water to form protons shown by the reaction sequence below. The presence of sodium dithionite in the reaction mix also serves to be an oxygen scavenger to maintain the anaerobic environment, in addition to being a sacrificial electron donor to fill the exciton hole formed as a result of photo-activation of the CdSe nanoparticle (13).

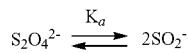

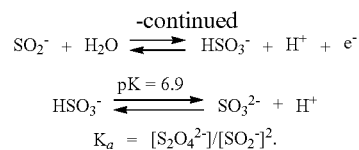

$$K_a = [S_2O_4^{2-}]/[SO_2^{-}]^2.$$

Without wishing to be bound by theory, it is believed that dithionite binds to the surface of the nanoparticle and may contribute ligand effects. The suggestion is that the catalyst undergoes changes from what it is originally after sample set up and that these changes are observed in the UV-vis spectra, the actual appearance of the catalyst solution, and the measured amount of hydrogen produced. The role that sodium dithionite plays in those changes can be explored with nanoparticle surface characterization techniques such as TEM (14). In an embodiment, maintaining a level of electron and proton donor concentration may be achieved using other sources than sodium dithionite, such as acetic acid, ascorbic acid, citric acid, and carbon dioxide dissolved in water.

In embodiments, the system undergoes a spectral change that has some correlation to the higher rate of hydrogen production.

In embodiments, hydrogen generation can be turned on and off by addition or removal of a light source.

In embodiments, the stability of the system can be enhanced by the presence of the protein component.

Certain advantages of the presently disclosed CdSe-NafY-FeMo-co system over other hydrogen generation methods are summarized below.

| Hydrogen generation method | Advantage of CdSe—NafY—FeMo—co system of the present disclosure |
|---|---|
| Steam reforming | 1. Ambient temperatures and pressures.<br>2. Produces pure hydrogen that will not poison fuel cell catalyst because of the enzymatic component in the reaction.<br>3. Green energy; no carbon footprint. |
| Electrolysis | 1. Demonstrated duration up to 39 days.<br>2. Electrodes in electrocatalytic solutions corrode within a few days. (18)<br>3. Large overpotentials are required to split water. There is no economic advantage of producing hydrogen for electricity used, when the electricity is supplied by the grid. |
| Methods using platinum | 1. The nanoparticle used is comprised of an abundant earth metal. It is readily synthesized and functionalized. It is low cost relative to platinum.<br>2. The CdSe nanoparticles are reliably photo-active and are shelf stable in aqueous solution for six months or longer. |
| Methods using a nanoparticle and hydrogenase | 1. This method uses FeMo—co extracted from nitrogenase and performs a unidirectional reaction. Hydrogenase is bidirectional, meaning as soon as hydrogen is formed, the reverse reaction starts. (19)<br>2. MoFe protein from nitrogenase is homologously recombined into its host organism, *Azotobacter vinelandii*. The genes for hydrogenase are heterologously recombined into *E. coli* and the bacterial growth yields are considerably smaller than that for MoFe protein. This is very important for scaling up (20).<br>3. Some methods use $TiO_2$ with a photosensitizer such as a ruthenium complex coupled with hydrogenase. The $TiO_2$ responds best to UV light and can damage the protein. CdSe—NafY—FeMo—co is a much more stable system (10). |
| Algae farm to produce biofuel | At current rates of hydrogen production and with scaling up, the volume needed to produce 44 kg $H_2$/day would be 12 ft × 12 ft × 12 ft = 1728 ft³. This amount of hydrogen in an FCEV would be enough to fill nine cars and each has the capacity to go 350 miles. To produce the same amount of biofuel to run a car engine, an algae farm would require 7 acres of raceways, which is equivalent to an area of 304,920 square feet - 552 ft by 552 ft. (21) |

EXAMPLES

Aspects of the present disclosure may be further understood in light of the following examples, which should not be construed as limiting the scope of the present disclosure in any way.

Example 1. Preparation of Hydrogen Generation Reaction Components

In an embodiment, the components that comprise the catalyst were assembled. *Azotobacter vinelandii* cells were genetically engineered by attaching a polyhistidine tag to the C terminus of Nif D of the Nif DK gene that codes for the MoFe protein, Component I of the nitrogenase enzyme. This gene construct is identified as DJ 995 (8). The MoFe protein was anaerobically purified by cell wall lysis and by way of zinc charged immobilized metal affinity column and ion exchange column liquid chromatography. The iron molybdenum cofactor (FeMo-co) was acid extracted and was dissolved into an organic solvent, N-methylformamide, under strict anaerobic conditions (9).

An inexpensive light harvesting material, cadmium selenide, was synthesized and functionalized by exchanging capping agents trioctylphosphine for mercaptosuccinic acid to allow for aqueous solubilization, (CdSe-MSA) (10). The NafY-FeMo-co was combined under strict anaerobic conditions in a Millipore concentrator. The concentrated NafY-FeMo-co solution was added to a crimped seal sample vial with an inert atmosphere. The same number of moles of CdSe-MSA were added to the vial and the catalyst underwent self-assembly. See FIG. 1 for graphic of the hydrogen generation system. Thirty minutes later the solution was brought to 2.0 mM sodium dithionite, ($Na_2S_2O_4$). UV-visible absorption spectra were measured of the samples and baseline corrected. The samples were put in front of the LED panels. Temperature was monitored. Head space samples were drawn roughly every 24 hours or multiple day intervals and injected into a gas chromatograph. One day is roughly 24 hours.

In an embodiment, a baseline of hydrogen production was established with reaction components using new equipment, *Azotobacter vinelandii* cells, newly synthesized and functionalized cadmium selenide particles was initiated as described herein. These validation hydrogen production values were calculated assuming one mole of catalyst, CdSe-NafY-FeMo-co at 0.014 kg $H_2$/mol catalyst/day.

In an embodiment, the experimental conditions were as follows. 2.0 µM CdSe-NafY-FeMo-co in 25 mM Tris, 2.0 mM $Na_2S_2O_4$ samples were set up and thoroughly degassed using a Schlenk line apparatus. Optimization sets of experiments were run with the same catalyst concentrations except for a set in Optimization Set J, which had 10 mM $Na_2S_2O_4$, which acts as the sacrificial electron donor. The hydrogen generation rate of the CdSe-NafY-FeMo-co system increased from a validation rate of 0.014 kg $H_2$/mol catalyst/day to an average of 44.1 kg $H_2$/mol catalyst/day in Optimization Set AA in the samples with 10 mM $Na_2S_2O_4$. This is identified as a "burst" rate that typically is not sustained beyond the measurement at 24 hours since experiment initiation.

This rate increase was calculated assuming there is one mole of catalyst and that there is one to one scale up potential of the system. The system has already undergone one scale up achievement in going from a 1.5 mL volume of components to a 2.5 mL volume with corresponding increase overall of hydrogen production.

Figure 2:
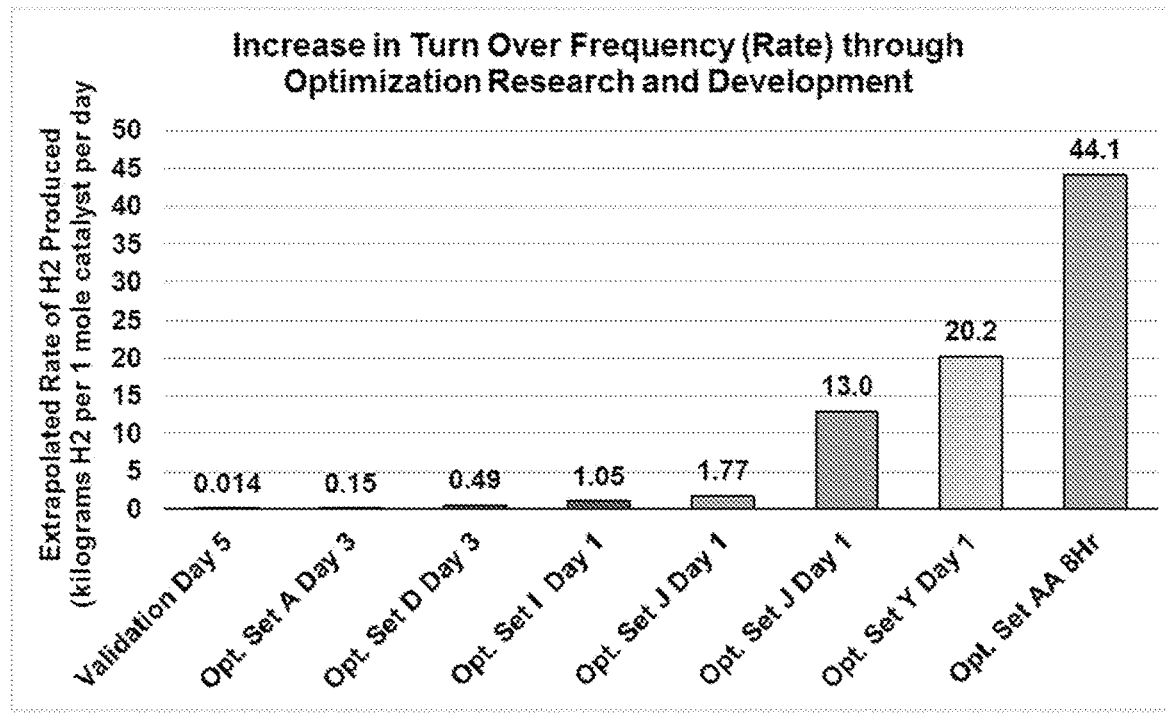
FIG. 2. Hydrogen generation progress showing exemplary hydrogen samples with volume of hydrogen produced comparison over an 18-month period.
Figure 3:
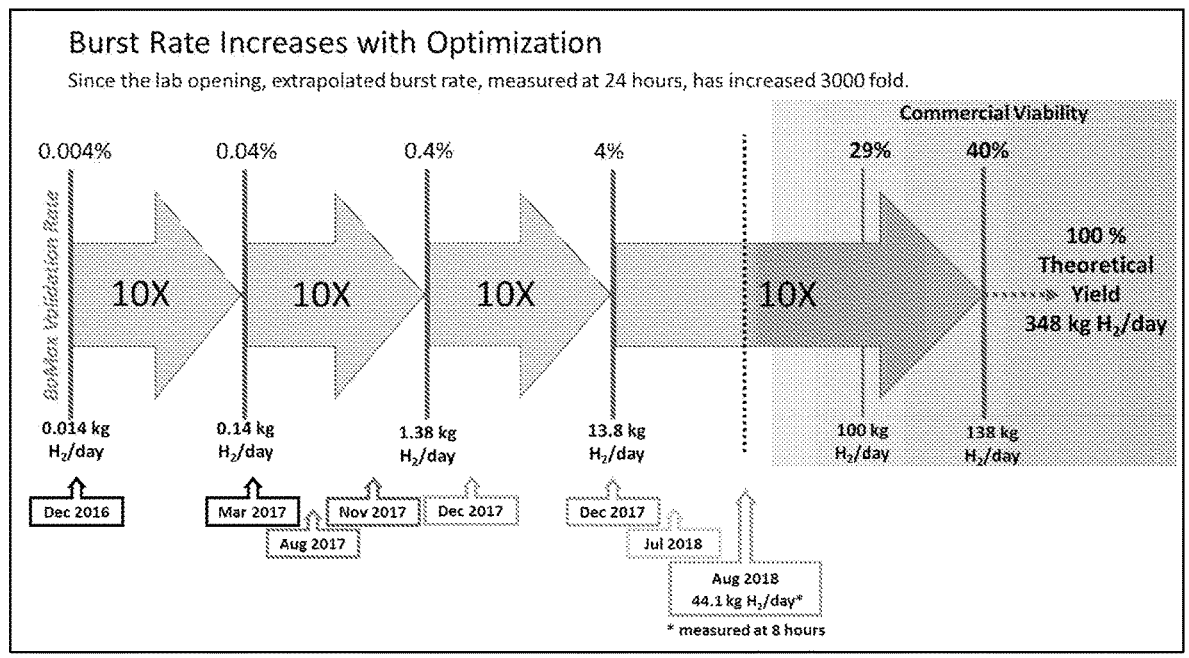
FIG. 3. Burst rate measured at 24 hours demonstrating the 3000 fold increase since early validation experiments. Progress is tracking towards attaining commercial viability and entry into the hydrogen and fuel cell markets.

Shown in FIG. 2 and Table 1 are a graphical and a tabular representation of the rate increases since the validation sets of experiments that set a baseline followed by Optimization sets with corresponding increases in hydrogen production.

TABLE 1

Experimental set label, reaction rates, and concentration of sodium dithionite.

| Hydrogen production per one mole catalyst | [$Na_2S_2O_4$] |
| --- | --- |
| Validation - 0.014 kg $H_2$/day | 2 mM |
| Optimization Set A -0.15 kg $H_2$/day | 2 mM |
| Optimization Set D- 0.49 kg $H_2$/day | 2 mM |
| Optimization Set H - 0.56 kg $H_2$/day | 2 mM |
| Optimization Set I - 1.05 kg $H_2$/day | 2 mM |
| Optimization Set J- 1.77 kg $H_2$/day | 2 mM |
| Optimization Set J - 13.0 kg $H_2$/day | 10 mM |
| Optimization Set Y - 20.2 kg H2/day | 10 mM |
| Optimization Set AA - 44.1 kg H2/day | 10 mM |

Example 2. Effect of Various Wavelength and Intensity of LED Lights Illuminating Hydrogen Generation Samples Initially hydrogen generation samples were set up in the validation phase illuminated by a 500-watt halogen lamp. Optimization sets were set up in front of LED lights, first each vial on a single white LED, and then next in front of specific wavelength LED panels with 232 individual LED lights embedded over 3 inches×8 inches area and attached to a power source, which allowed for adjustment of brightness (intensity). Use of the specific wavelength LEDs led to understanding that installing the samples in front of the more energetic (lower) wavelengths led to higher hydrogen production.

Samples were situated so that they are illuminated from both sides (front and back), by an LED panel. Royal blue (peak wavelength of 425 nm) LEDs have been shown to yield high level hydrogen production at a combined intensity of 80,000 lux with the highest rate of production measured at an average of 44.1 kg $H_2$/mol catalyst/day at 8 hours of light exposure with a 10 mM $Na_2S_2O_4$. Blue (peak wavelength of 460 nm) LEDs demonstrated the second highest hydrogen generation so far with an intensity measurement of 300,000 lux in combination for the Optimization Set J with 10 mM $Na_2S_2O_4$ measured at 24 hours, mentioned previously.

Figure 4:
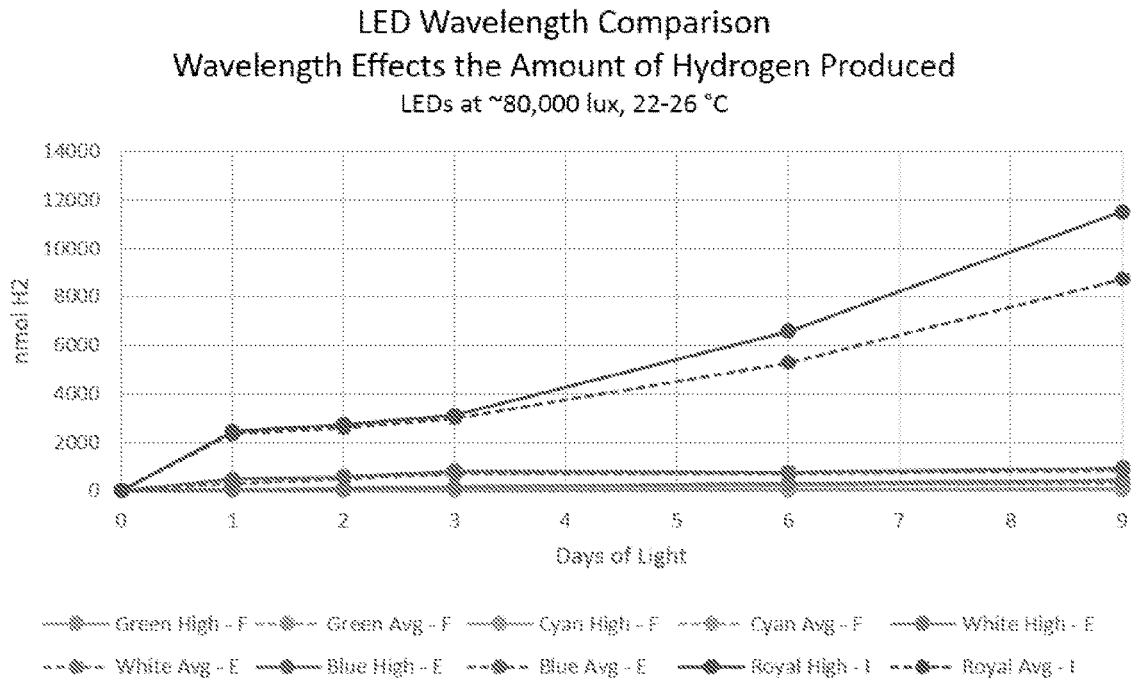
FIG. 4. Comparison of hydrogen production in samples illuminated with specific wavelength LED light. The samples in front of royal blue LED lights produce the most hydrogen over time. Reaction conditions were 2 µM CdSe, 2 µM NafY-FeMo-co, 2 mM $Na_2S_2O_4$.

Various light wavelengths and intensities were applied to sets of 2.0 µM CdSe-NafY-FeMo-co in 25 mM Tris, 2.0 mM $Na_2S_2O_4$ samples using identical components from the same batches to illustrate that higher energy LEDs result in higher hydrogen production rates. Samples for green (525 nm), cyan (510 nm), white (460 nm with phosphor) and blue (460 nm), LED lights were maintained within the desired temperature range (22-26° C.) by the use of air circulation with fans. The royal blue (425 nm) LEDs required the use of a TECA Peltier cooling plate to maintain the desired temperature. In an embodiment, the samples in front of the royal blue LEDs demonstrated the highest hydrogen generation rates when all other variables were the same. In an embodiment, blue outcompetes white light. White light and cyan lights yield similar hydrogen production. The results are shown graphically in FIG. 4. Note that the average of each light set is shown with the dotted line. The solid line shows the highest producing sample. In an embodiment, the higher producing sample within a sample set corresponded to its position in front of the LED light panel. Samples on the ends tended to get less overall light exposure and did not produce as much hydrogen.

Example 3. Spectral Changes Observed During the Course of Hydrogen Generation Experiments The conclusion that the royal blue LED lights yield greater hydrogen production were observed; however, changes in appearance observed in the samples themselves were noticeable by eye and by spectral changes. Two characteristic changes were observed in the UV-vis spectra. Typically, within the first 24 hours there was a ~10 nm red shift in the absorption spectrum. This red shift would also correspond to an increase in hydrogen production. By eye, there was a color change in the sample. Second, over a few days illumination there was a diminishing in the absorbance and started a degradation process leading to precipitation of the quantum dots. If the absorbance decreased by half or more than this signaled a decrease in hydrogen production. It is hypothesized that the spectral changes observed may be associated with the $Na_2S_2O_4$ loading and its effects on the surface of the nanoparticle by contributing to ligand effects and thereby surface defects, which are known to diminish electron transfer to surface adsorbed molecules by means of recombination of excited electrons. To illustrate, FIG. 5 shows two different samples and the UV-vis spectra taken over a 15-day run with the same experimental conditions except for the wavelength LED illuminating the sample. Both samples show the red shift. The sample in front of the royal blue LED panels has a noticeable absorbance decrease as compared to the sample in front of the white LED panels. In an embodiment, a set of conditions regarding LED illumination can both achieve optimal hydrogen generation and at the same time preserve the sample integrity of the catalyst to further enhance time length of performance. The blue LED or even white or cyan LEDs at higher intensity may achieve high hydrogen production with improved sustainability.

Enhancing hydrogen production can also be achieved through the use of other electron/proton donor components that may have more advantageous ligand effects leading to increased electron transfer and resulting in higher hydrogen production.

Figure 5A:
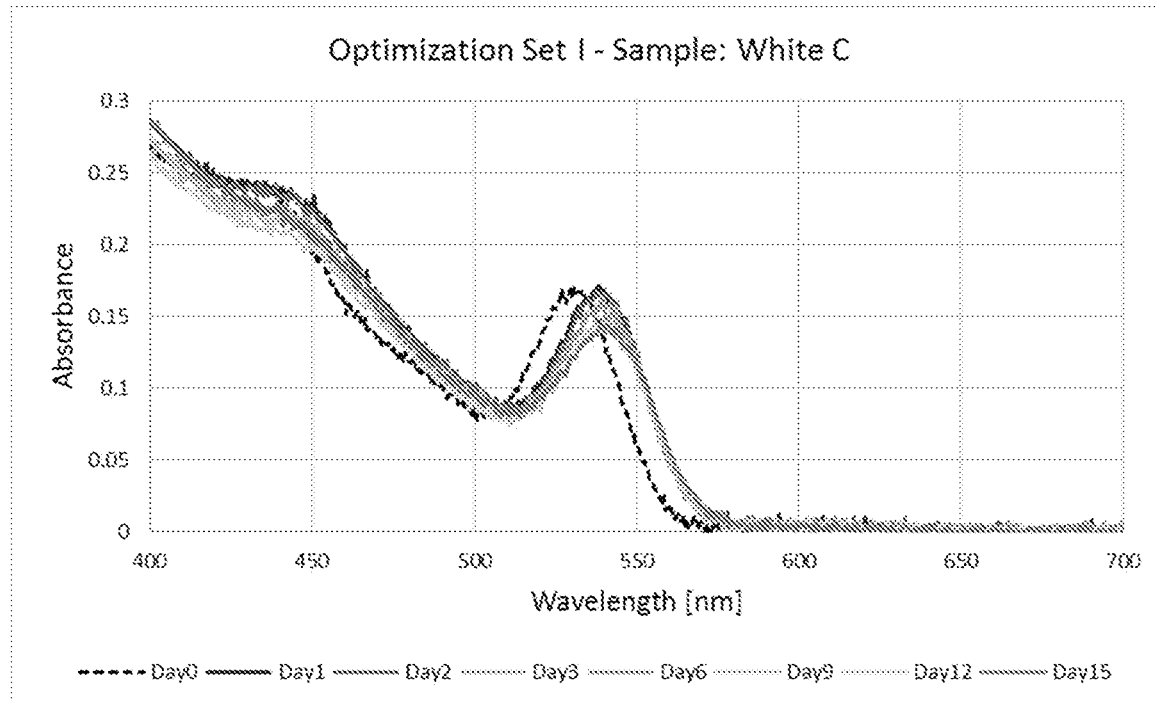
FIG. 5A. UV-vs spectra of hydrogen generation samples in front of white lights in a 15-day experiment. Reaction conditions were 2 µM CdSe, 2 µM NafY-FeMo-co, 2 mM $Na_2S_2O_4$. Note the red shift of the dominant feature of the absorption spectrum measured after 24 hours of light exposure. This shift correlates with increased rates of hydrogen production. The absorbance starts to diminish after 15 days of light exposure, which corresponds with observed photobleaching of the solution color and a loss of catalytic ability.
Figure 5B:
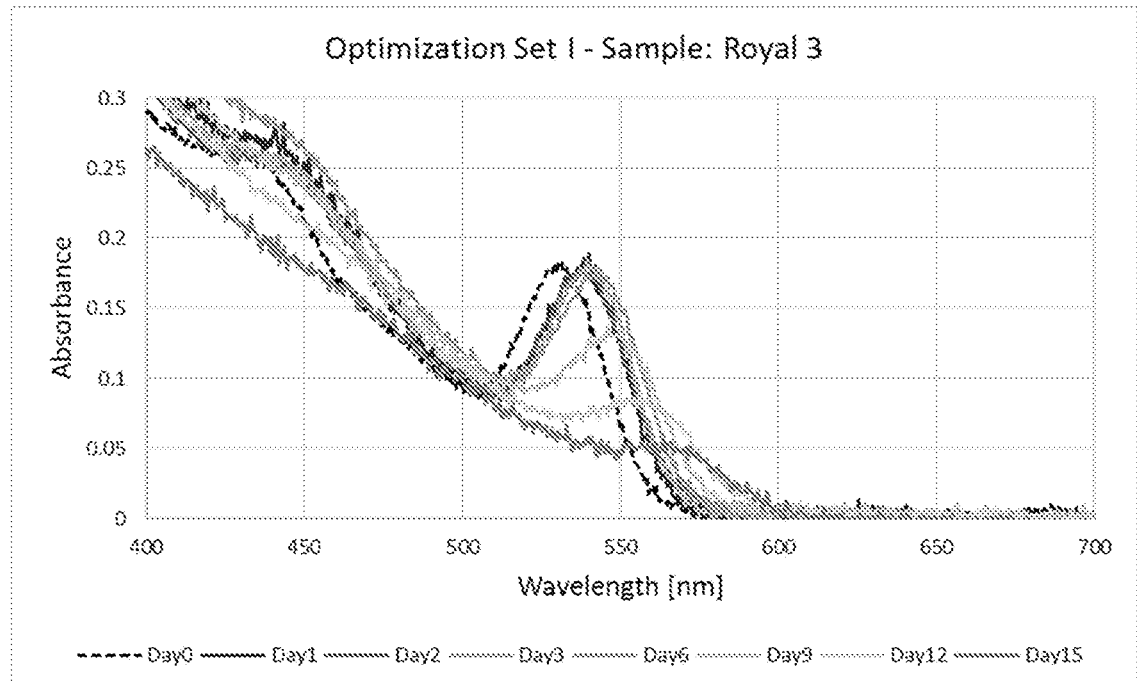
FIG. 5B. Samples were illuminated with royal blue LEDs with the same reaction conditions as in FIG. 5A only illuminated with less energetic lights. Note the same initial red shift of the dominant feature, but the absorbance diminishes at a quicker rate than those samples illuminated with white LEDs. Samples start the degradation and/or photobleaching at Day 6 corresponding with precipitate accumulation.

FIGS. 5A and 5B show UV-vis spectra of Optimization Set I samples. Samples above (FIG. 5A) were illuminated with white LEDS and show sustained absorbance until Day 15 and continuous catalytic function to produce hydrogen. Samples below (FIG. 5B) were illuminated with royal blue LEDs with pronounced decrease in absorbance at Day 6 which have its effects on catalytic performance.

In conclusion, exposure to higher energy LED source light, appeared to accelerate the surface changes of the nanoparticle indicated by the red shift followed by diminishing absorbance and thereby contributing to the catalytic degradation.

Figure 6:
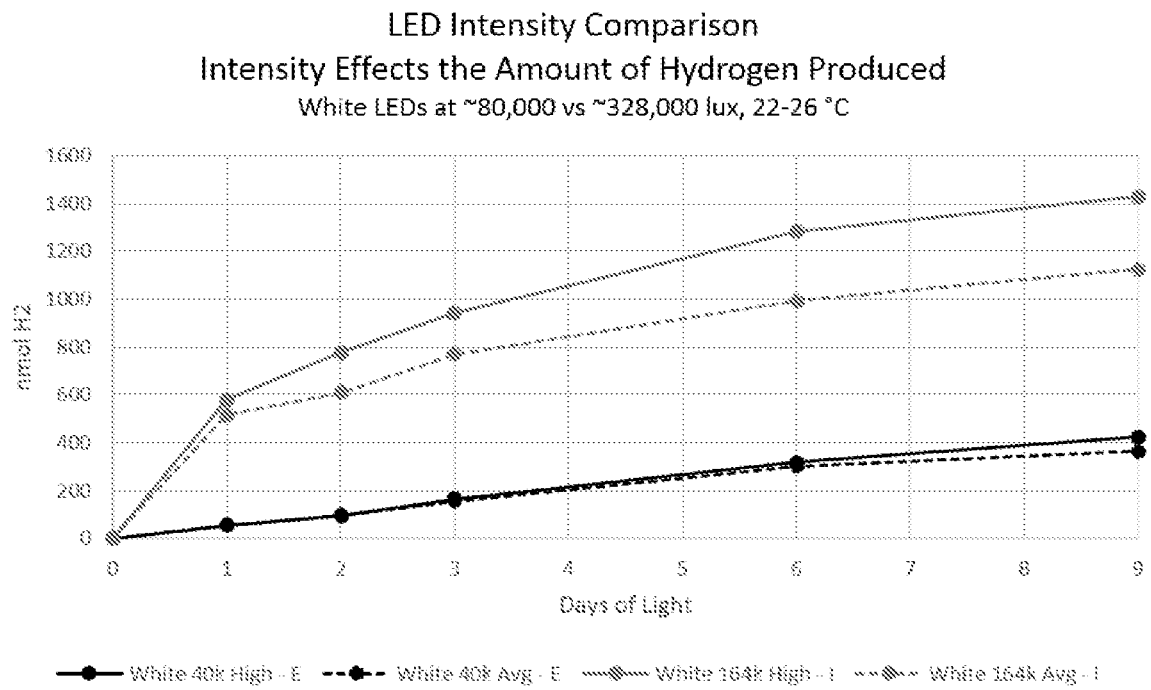
FIG. 6. Plot shows comparison between two sample sets with the same conditions (2 μM CdSe, 2 μM NafY-FeMo-co, 2 mM $Na_2S_2O_4$), illuminated both with white LEDs, however with different intensity measurements. Higher intensity results in higher hydrogen production rates.

Example 4. Intensity Variations in Experiments and Corresponding Hydrogen Production Values Intensity can have a significant effect upon rates of hydrogen generation. In an embodiment, two sets of samples were set up with identical conditions: 2.0 µM CdSe-NafY-FeMo-co in 25 mM Tris, 2.0 mM $Na_2S_2O_4$. The plots shown in FIG. 6 were the results of the white LEDs at 80,000 lux vs the maximum lux achieved using fans to cool the lights and samples to an acceptable range. The data plotted in the solid black line was the high producing sample and the dotted line the average of the 80,000 lux experiment under white LED light. The data plotted in grey solid and dotted lines were the result of increasing the intensity to 328,000 total lux for the same white LEDs.

Figure 7:
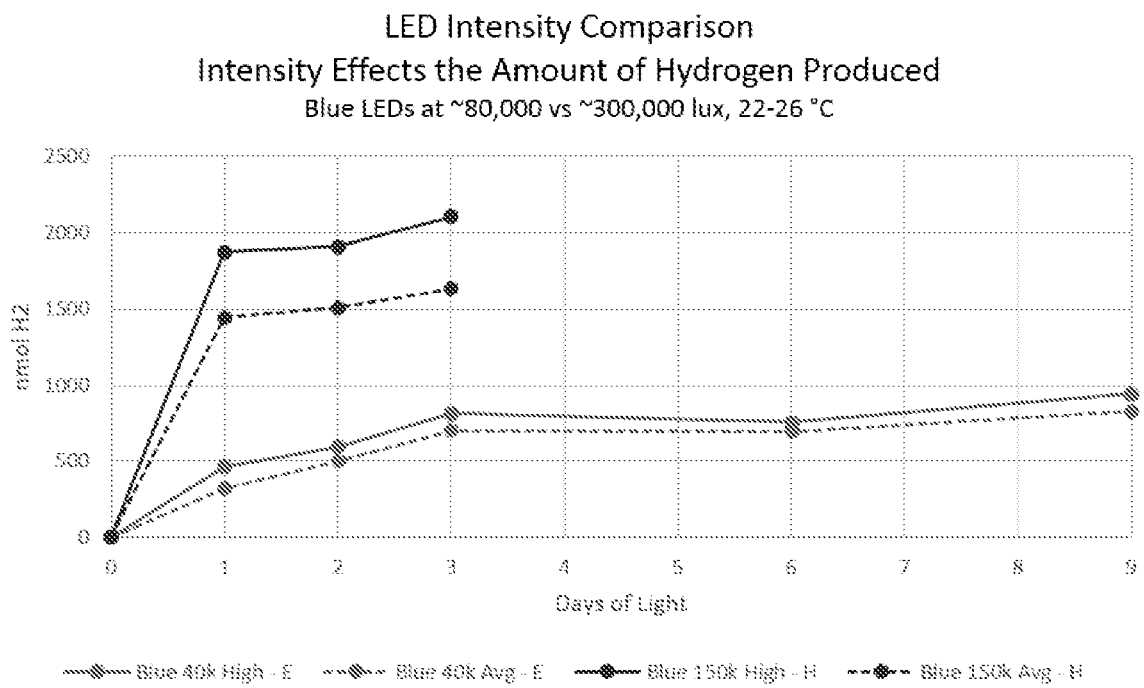
FIG. 7. Comparison of two sample sets in front of different intensities but with the same wavelength LED light—blue. Reaction conditions are otherwise the same. The higher intensity LED illumination results in higher initial hydrogen production.

In an example shown in FIG. 7, higher intensity results in higher hydrogen generation rates. Blue LEDs were placed at maximum intensity with the aid of a cooling plate to maintain an acceptable range of temperature at the samples. Also note here that while the intensity increased was roughly a 4-fold increase from 80,000 total lux to about 328,000 total lux, the amount of hydrogen generated was more than a 4-fold increase for the first several days of the experiments.

Again, note that the higher intensity of Blue LED light produces a higher amount of hydrogen. Here the effect of intensity on amount of hydrogen produces is closer to a linear response.

Figure 8A:
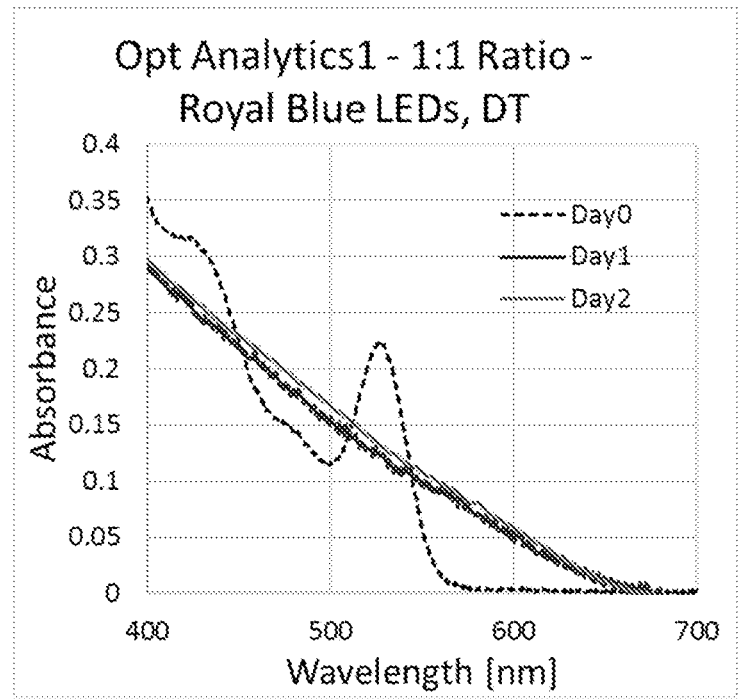
FIG. 8A. Optimization Set Analytics 1 samples were set up in the highest intensity Royal Blue LED lights. Samples achieved a high burst rate of roughly 20.5 kg $H_2$/mol catalyst/day measured at 24 hours of light exposure; however, the catalyst nanoparticle absorbance was not sustained and the nanoparticles precipitated within the first 24 hours. Reaction conditions were 2 μM CdSe, 2 μM NafY-FeMo-co, 10 mM $Na_2S_2O_4$. Note the ratio between the CdSe and NafY-FeMo-co is 1:1.
Figure 8B:
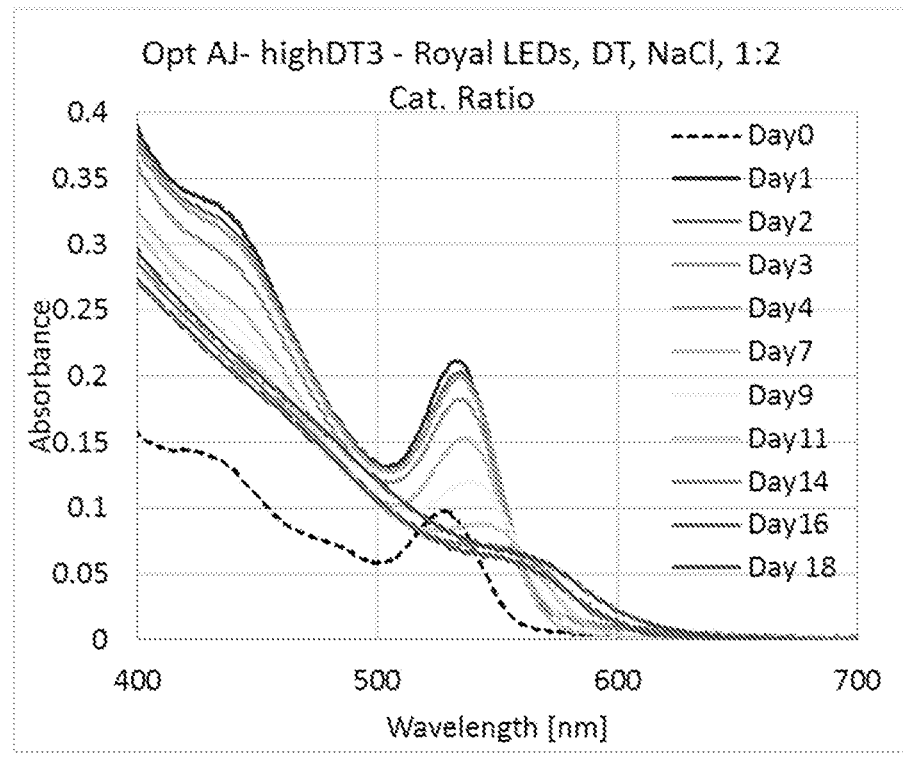
FIG. 8B. Samples set up in front of royal blue LEDS; however, at half the intensity and with a 1:2 ratio between CdSe and NafY-FeMo-co components. The samples were sustained as observed by the UV-vis spectra until significant loss of absorption occurs beyond Day 4 of light exposure.
Figure 8C:
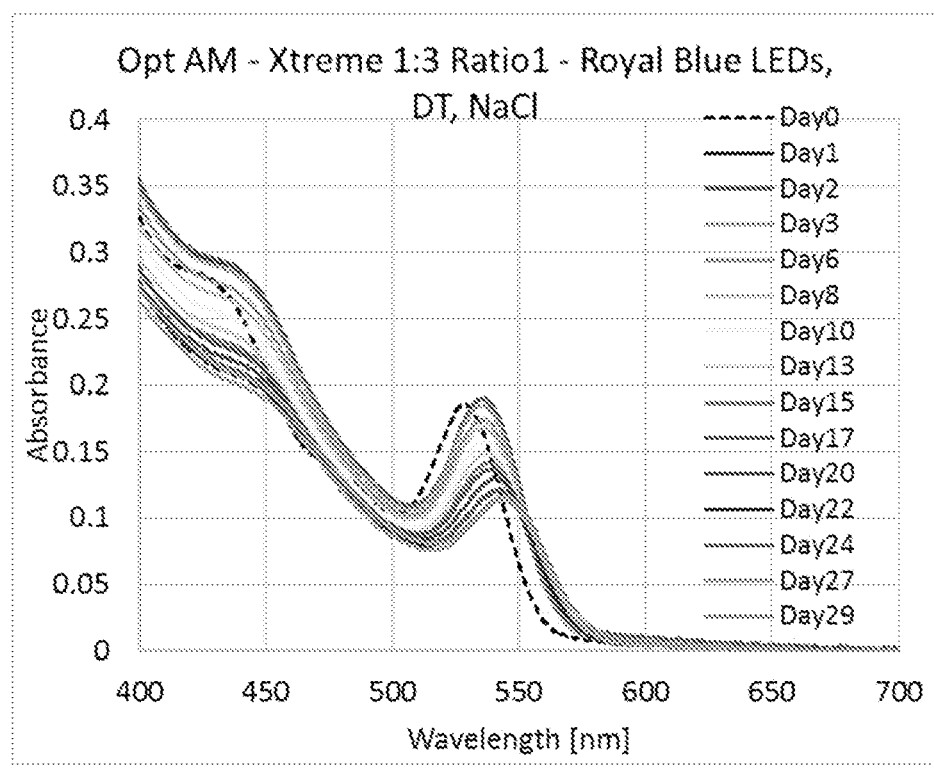
FIG. 8C. Samples set up in front of royal blue LEDS; however, at half the intensity and with a 1:3 ratio between CdSe and NafY-FeMo-co components. The samples were sustained as observed by the UV-vis spectra until significant absorption loss occurs beyond Day 10 of light exposure.

Example 5. Changes in Ratios Between Reaction Components and Their Effects on Duration of Hydrogen Production The purpose of the work described is to increase hydrogen production and to sustain the hydrogen production for 30, 60, and 90 days. As noted, a more energetic (shorter wavelength) LED light source and increased intensities (brightness) lead to higher hydrogen production. This can also be problematic because the degradation of the catalyst in colloidal solution is accelerated with more energetic and intense LED light conditions. Changes in ratios of components were made to sustain the catalyst integrity using the more extreme conditions of high energy and high intensity LEDs. For instance, samples are shown in FIGS. 8A, 8B and 8C in a side by side comparison of different ratio components in front of royal blue LEDs. FIG. 8A shows UV-visible spectroscopic data from Optimization Analytics 1 with a 1 to 1 ratio of components in front of high intensity royal blue LEDs. The catalyst sample has precipitated by 24 hours; however, roughly 20.5 kg Hz/mole catalyst/day was measured at 24 hours. Precipitation occurred in the first 24 hours as a result of the harsh conditions of LED illumination and high 10 mM $Na_2S_2O_4$ loading as illustrated by the severely diminished absorbance spectra on Day 1 and Day 2. FIG. 8B shows Optimization AJ with a 1:2 ratio of CdSe to NafY-FeMo-co and FIG. 8C shows Optimization AM with a 1:3 ratio CdSe to NafY-FeMo-co both with half intensity LED conditions compared to the Optimization Analytics 1 set. The 1:2 ratio sample, Optimization AJ, sustained its absorbance until significant loss of absorption occurs beyond Day 4 of light exposure and nearly no absorption occurring beyond Day 14. The 1:3 ratio sample, Optimization Set AM showed spectral evidence of sustained absorbance through Day 10 with significant absorbance observed at Day 29.

Figure 9A:
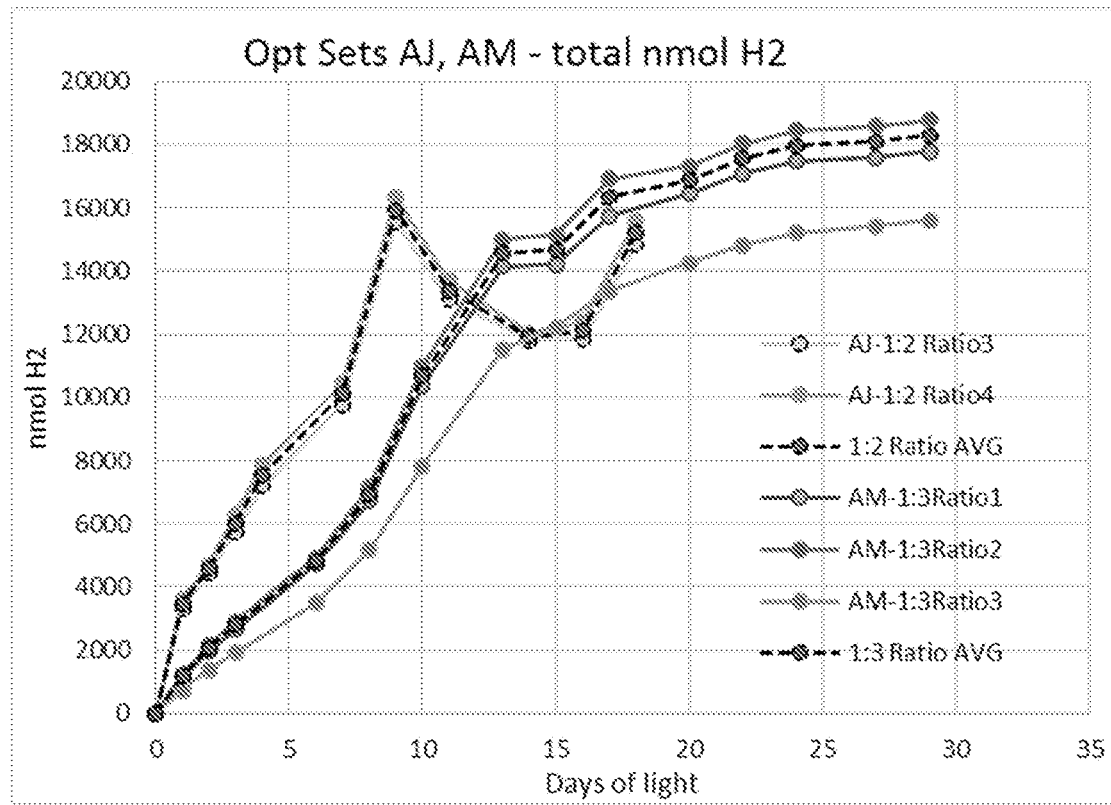
FIGS. 9A and 9B. Hydrogen generation for sample sets with 1:2 and 1:3 ratios, CdSe to NafY-FeMo-co. 1:2 ratio samples had higher burst rate; however, sustained and steady hydrogen generation was demonstrated by the 1:3 ratio samples.
Figure 9B:
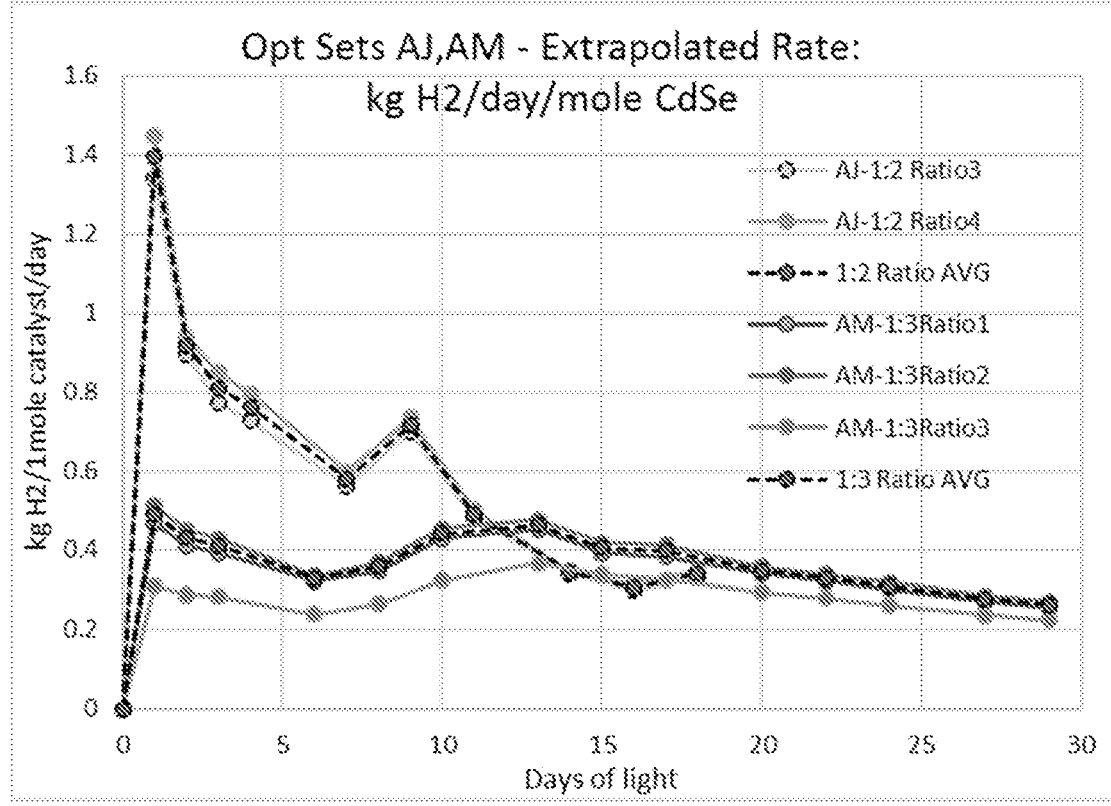

Hydrogen production for Optimization sets AJ and AM are shown in FIGS. 9A and 9B. FIG. 9A is a plot of total amount of hydrogen produced during the sustained time period of 16 days for Set AJ and for 29 days for Set AM. The rate of production is plotted in FIG. 9B for both sets. Typically, as observed is a high peak rate during the first 24 hours with Set AJ. Set AM does not show the peak rate; however, a sustained rate of production is achieved for 29 days. Ultimately, note that the 1:2 ratio sample initially outperformed the 1:3 ratio sample with an initial, non-sustained burst rate, but that the 1:3 sample outperformed the 1:2 ratio samples with duration and higher rate of production beyond 10 days of light.

In conclusion, with high energy wavelength lights, excess amount of NafY-FeMo-co to the CdSe results in longer sustained electronic properties and homogeneity of solution. Furthermore, steady rate of hydrogen generation can be achieved with high energy wavelength light with higher NafY-FeMo-co loading vs the CdSe component.

Longer wavelength LED light (less energetic) comparison data also show that increasing the NafY-FeMo-co component concentration compared to the CdSe component results in increasing the duration of the sample performance for hydrogen production and sustaining the catalyst as observed in the UV-vis spectra.

For example, sample set AG with 3 samples at 1:1 ratio (5 nmol each), 3 samples at 1:5 ratio* (1 nmol CdSe, 5 nmol nafY-FeMo-co) were set up in front of white (blue (460 nm) with phosphor filter). Asterisk denotes the different ratio, but the atypical amount of CdSe in sample solution compared to other samples. Sample AI with 3 samples at 1:2 ratio (5 nmol CdSe to 10 nmol NafY-FeMo-co). All these samples were run with 2 mM acetic acid and 1 mM $Na_2S_2O_4$ target. The UV-vis data are shown in FIGS. 10A through 10C.

Figure 10A:
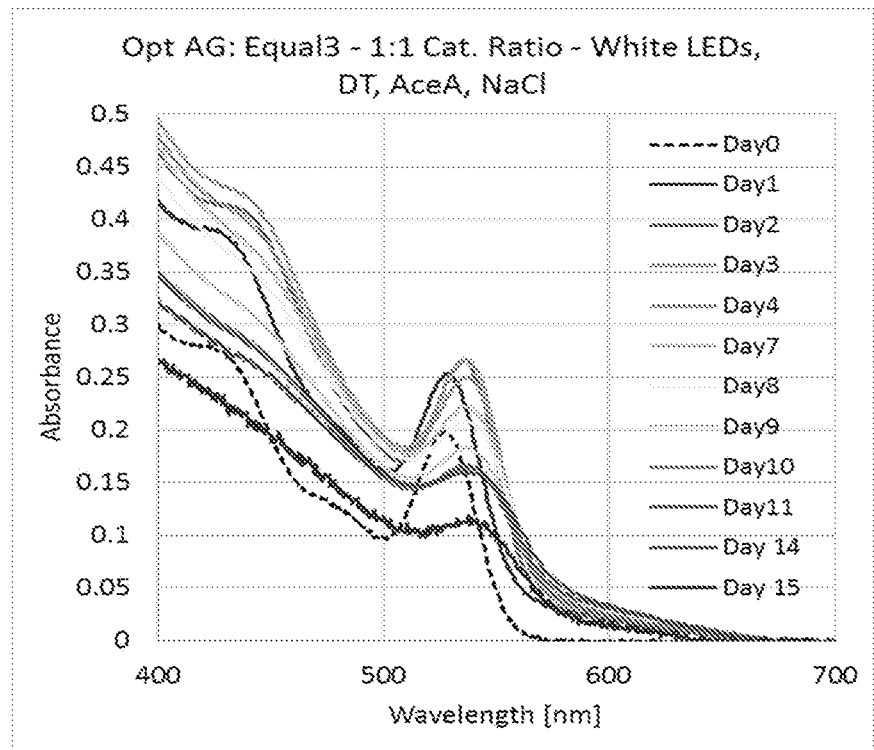
FIGS. 10A, 10B, and 10C. Contrast of UV-vis data with various ratio between components in front of high intensity white LED lights, CdSe to NafY-FeMo-co. The 1:1 ratio UV-vis absorbance shows significant diminishing by Day 8. 1:2 samples show absorbance diminishing by Day 20 with nearly no absorbance by Day 37. 1:5 samples showed minor loss of absorption of the spectroscopic features through Day 25. Sample sets shown in FIGS. 10A and 10B were 2 μM CdSe, 2 μM NafY-FeMo-co, 5 mM NaCl, 1 mM $Na_2S_2O_4$, 2 mM acetic acid. Sample set shown in FIG. 10C was a 1:5 ratio with 1 μM CdSe, 5 μM NafY-FeMo-co, 5 mM NaCl, 1 mM $Na_2S_2O_4$, 2 mM acetic acid.
Figure 10B:
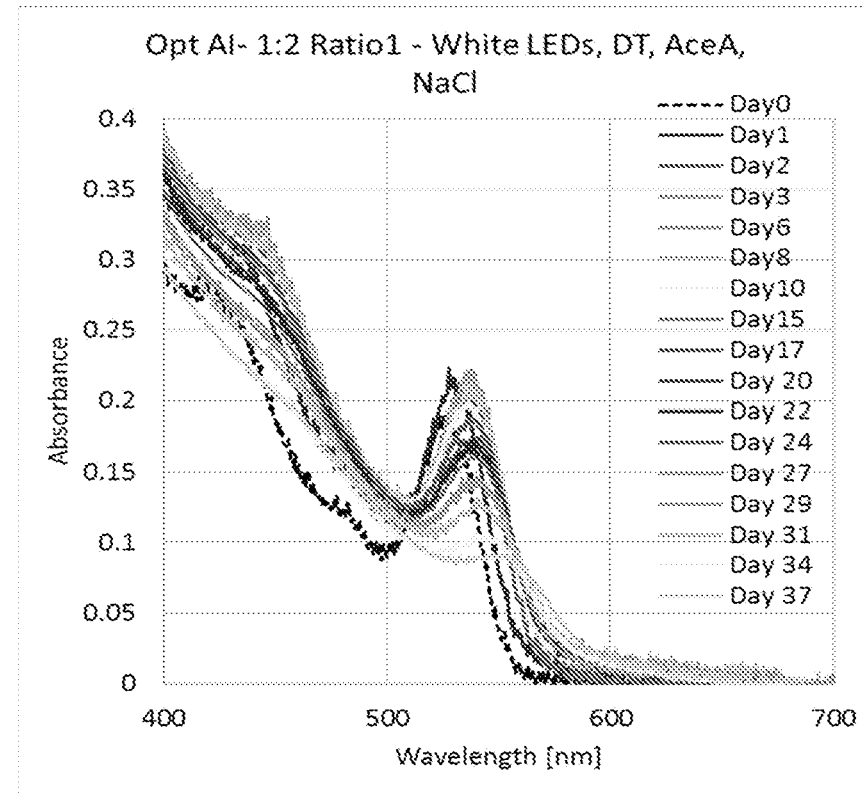
Figure 10C:
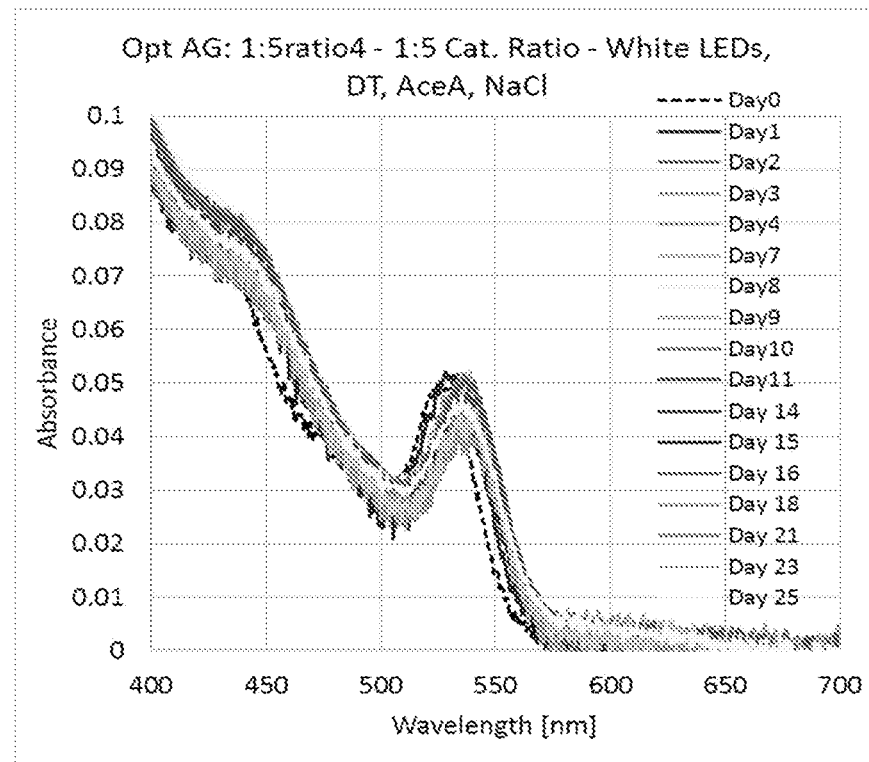

Sample sets shown in FIGS. 10A and 10B were 2 µM CdSe, 2 µM NafY-FeMo-co, 5 mM NaCl, 1 mM $Na_2S_2O_4$, 2 mM acetic acid. Sample set shown in FIG. 10C was 1:5 ratio with 1 µM CdSe, 5 µM NafY-FeMo-co, 5 mM NaCl, 1 mM $Na_2S_2O_4$, 2 mM acetic acid. Note that the 1:1 ratio samples (AG) were severely diminished by Day8 (FIG. 10A); the 1:2 ratio samples (AI) were diminished by Day 20 with nearly no absorption by Day 37 (FIG. 10B); and the 1:5* ratio samples (AG') retained the majority of the spectral features (retained original electronic properties) through Day 25 (FIG. 10C).

Figure 11A:
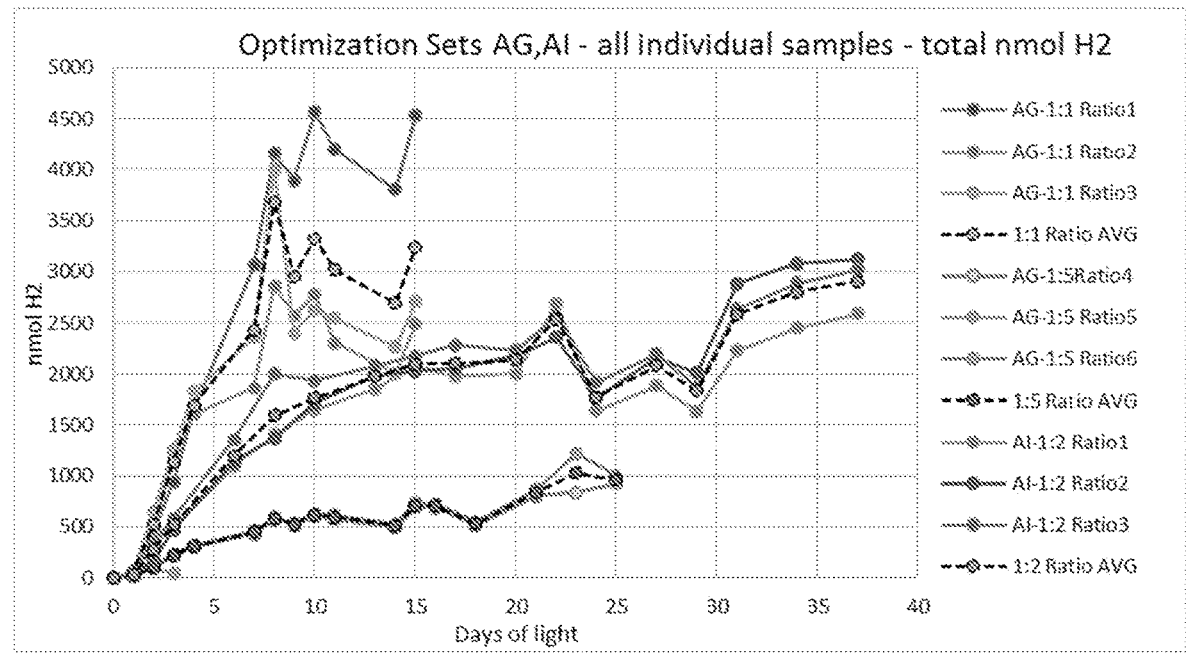
FIG. 11A. Total amount of hydrogen produced is shown for the three sets with different ratios as described in FIGS. 10A, 10B, and 10C.
Figure 11B:
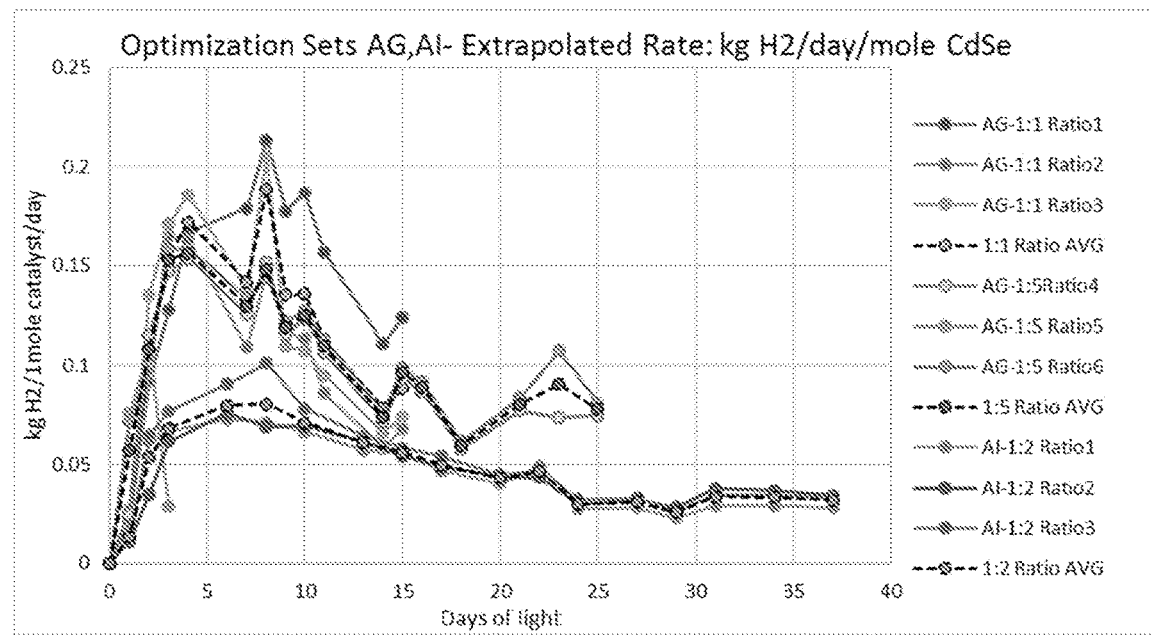
FIG. 11B. Extrapolated rate shown with steady rates achieved with the 1:2 ratio set. The 1:5 ratio set achieves a higher rate initial rate than the 1:2 ratio set and also resulted in a steady state rate corresponding to the UV-vis absorbance holding steady for multiple weeks.

Hydrogen gas production was measured by gas chromatograph and because the 1:5* ratio samples had a lower CdSe loading, the overall trend is not direct. Only two of the three sets of samples can be compared at a time rather than the three altogether. Overall, the 1:1 ratio samples (AG) produced more hydrogen than the 1:2 ratio samples (AI) than the 1:5* ratio samples (AG'). However, when comparing 5 nmol CdSe:5 nmol NafY-FeMo-co (1:1 ratio) and the 1 nmol CdSe:5 nmol NafY-FeMo-co (1:5* ratio) it is observed that they have nearly identical extrapolated rates of hydrogen generation of kg $H_2$/1 mole CdSe/1 day (See FIGS. 11A and 11B).

The 5 nmol CdSe:5 nmol NafY-FeMo-co (1:1 ratio) has a higher rate of hydrogen production than the the 5 nmol CdSe:10 nmol NafY-FeMo-co (1:2 ratio) as measured as extrapolated rate per 1 mole CdSe.

In conclusion, for samples in front of white LED lights, the higher the excess amount of NafY-FeMo-co to the CdSe results in longer sustained electronic properties and homogeneity of solution. Since feedstock solutions were not increased accordingly this meant that it resulted in lower rates of hydrogen production with the higher ratio NafY-FeMo-co to CdSe components. The essential point demonstrated here was the ability to maintain the integrity of the catalyst observed by the sustained rate of hydrogen production and the spectral data not diminishing.

Figure 12A:
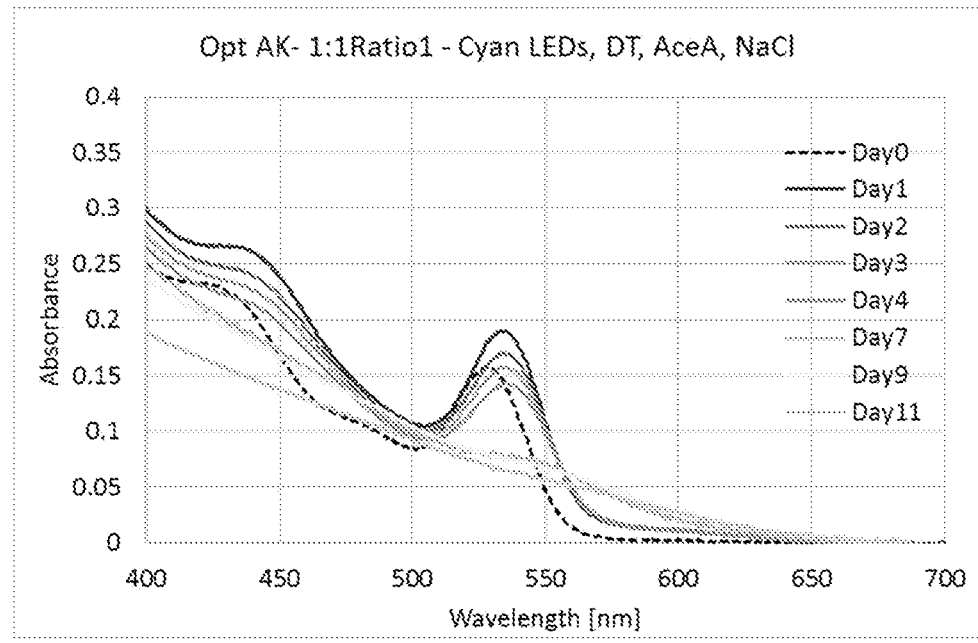
FIGS. 12A-12D show four contrasting ratio data sample sets between CdSe and NafY-FeMo-co at 1:1, 1:2, 1:3 and 1:4 in front of cyan LED lights at high intensity. The higher ratio samples have the best sustained absorbance data for the longest period of time. 2 μM CdSe, 2 μM NafY-FeMo-co, 5 mM NaCl, 2 mM $Na_2S_2O_4$ were the reaction conditions.
Figure 12B:
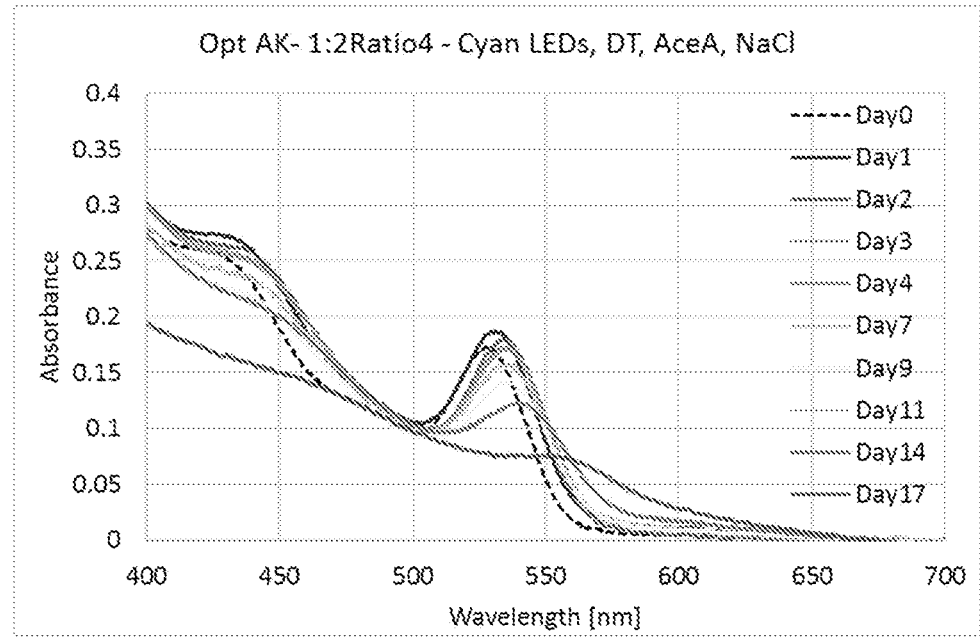
Figure 12C:
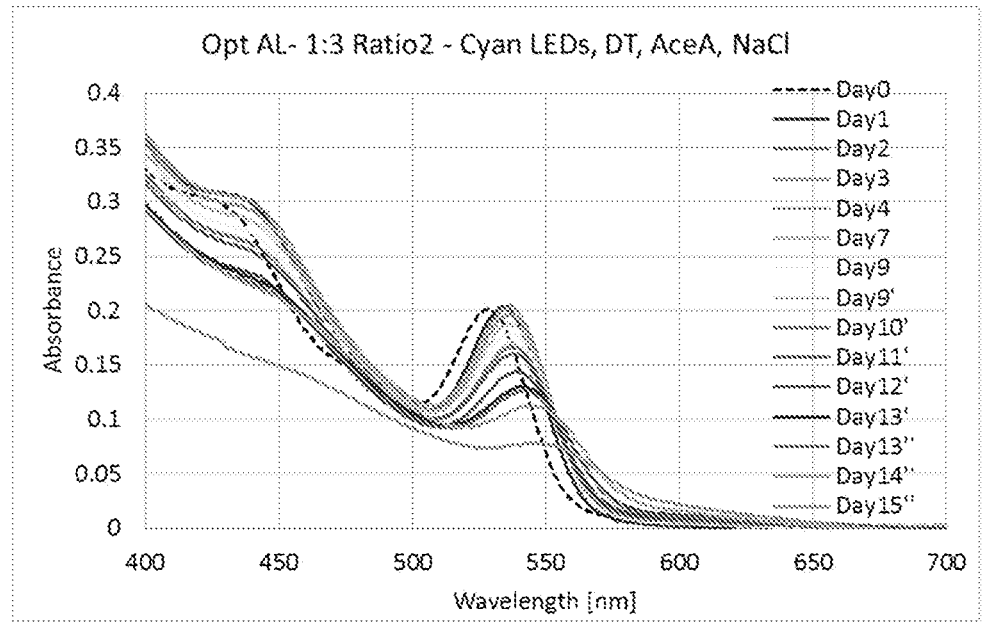
Figure 12D:
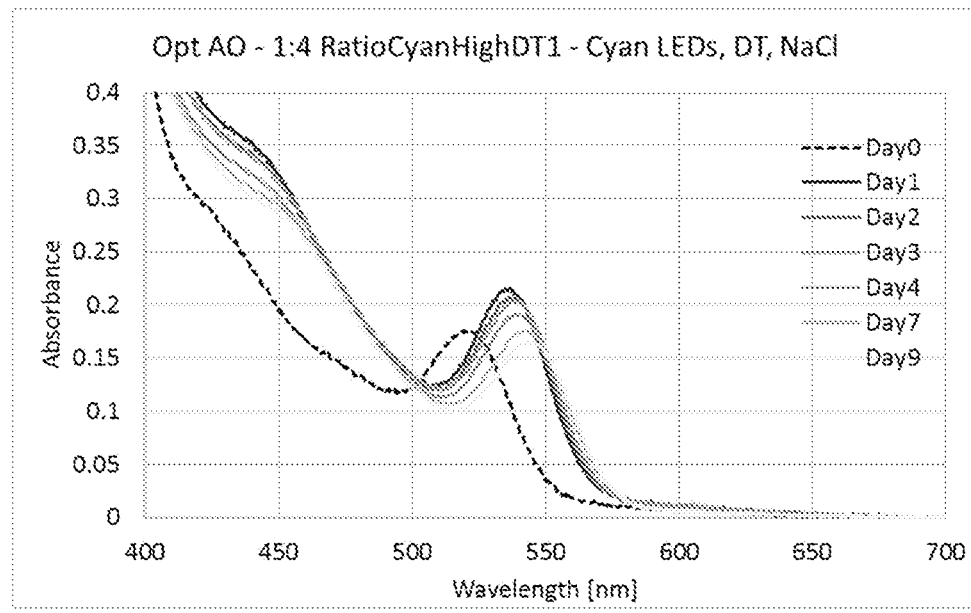

Another LED wavelength, cyan at 510 nm with high intensity at [18] 350,000 lux in total illumination of the samples showed similar results. Once again, the CdSe component is listed first in the ratio sets. Sample set AK with 2 samples at 1:1 ratio (FIG. 12A), 2 samples at 1:2 ratio (FIG. 12B). Sample set AL with 3 samples at 1:3 ratio (FIG. 12C). Sample set AO with 3 samples at 1:4 ratio (FIG. 12D). The sample sets had varying sacrificial electron and proton donors. Sets AK and AL were run with 4 mM acetic acid and 2 mM $Na_2S_2O_4$ target. Set AO had 100 mM $Na_2S_2O_4$ target.

The UV-vis spectral data showed the following. Note that the 1:1 ratio sample is severely diminished beyond Day 4, the 1:2 ratio samples diminished beyond Day9, the 1:3 ratio sample diminished by Day 12", and the 1:4 ratio sample has not reached a critical decline yet as of Day 9. The apostrophe notes, days with ' and ", indicate one period of darkness for each.

Figure 13A:
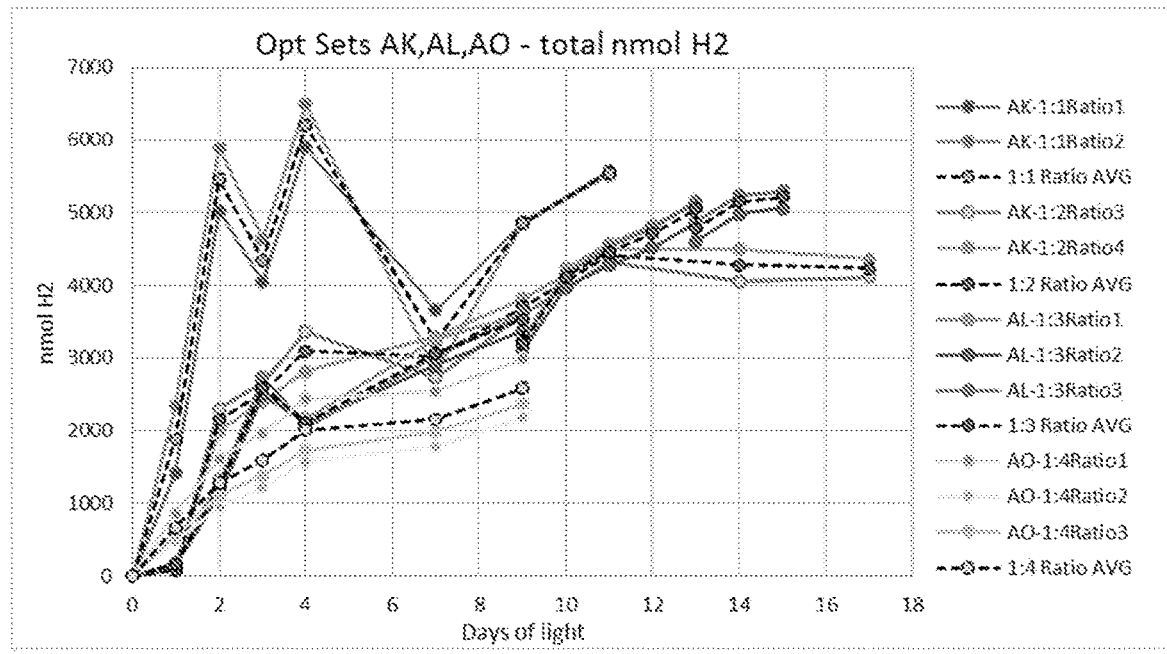
FIG. 13A. Comparison of total hydrogen produce between the samples in FIGS. 12A-12D. The 1:1 have the highest burst rate, however the steady hydrogen production is demonstrated best with the 1:2 and 1:3 samples.

Hydrogen generation data shows in FIG. 13A total amount of hydrogen produced. Sets AK and Sets AI approach the same totals of hydrogen produced at later days but the catalyst holds up and is intact for longer day periods. Higher feedstock of sacrificial electron and proton donors may yield higher rates and longer hydrogen production results.

Figure 13B:
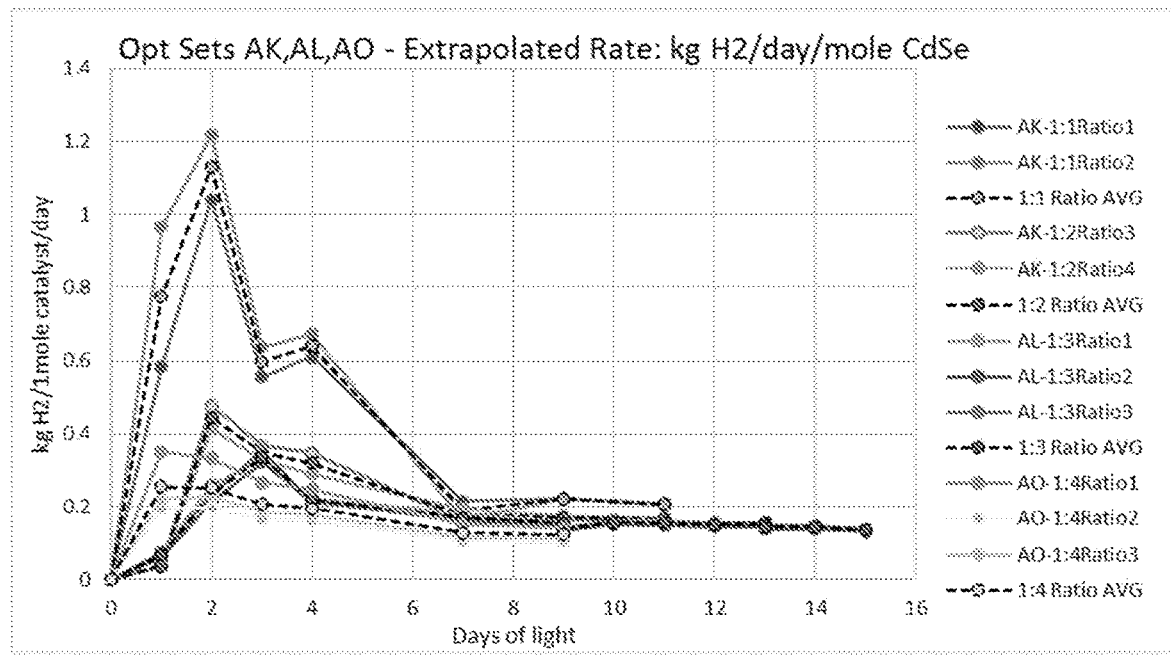
FIG. 13B. Extrapolated rates show the sustained rates are best achieved with the higher ratio sample sets. Higher hydrogen production rates have been achieved with higher sacrificial donor loading.

As seen in FIG. 13B, the 1:1 ratio sample set produce the most hydrogen initially with the highest rate, but this is a burst rate that is not sustained. The 1:2 and 1:3 ratio samples require a bit more of a ramp up time before reaching maximum rate. Both sets settle into a steadier rate with the 1:2 ratio samples reaching a higher peak rate and sooner than the 1:3 ratio samples. The 1:4 ratio samples have no acetic acid, but have a much, much higher $Na_2S_2O_4$ loading. These samples reach peak rate faster than the 1:1 ratio samples, but at a much lower rate. These samples do not go through a peak burst rate, but do settle into a steady rate immediately.

In conclusion, the higher the excess amount of NafY-FeMo-co to the CdSe results in longer sustained electronic properties and homogeneity of solution. This also directly results in lower rates of hydrogen production. Higher loading of feedstock can be tolerated by the catalyst to the point that the rate diminish could be countered with higher feedstock loading.

Figure 14A:
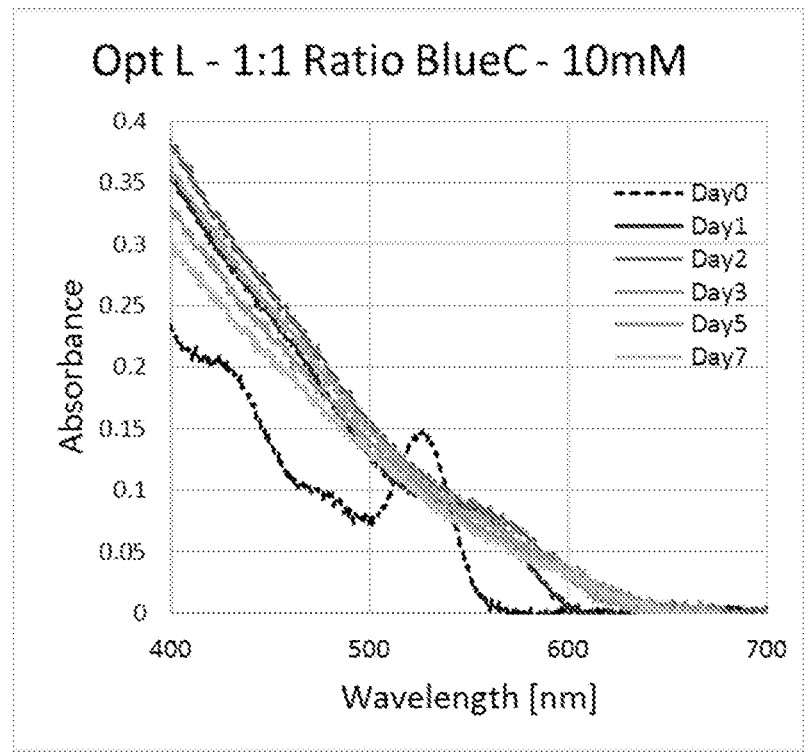
FIGS. 14A and 14B. Two sample sets were illuminated with high intensity blue LED lights. The ratios were 1:1 and 1:4 respectively, CdSe to NafY-FeMo-co. In the harsh blue light conditions, the 1:4 sample set maintains homogeneity for 22 days with moderate absorption loss. The 1:1 ratio sample set precipitated within 24 hours of light exposure. 2 μM CdSe, 2 μM NafY-FeMo-co, 5 mM NaCl, 10 mM $Na_2S_2O_4$ were the reaction conditions.
Figure 14B:
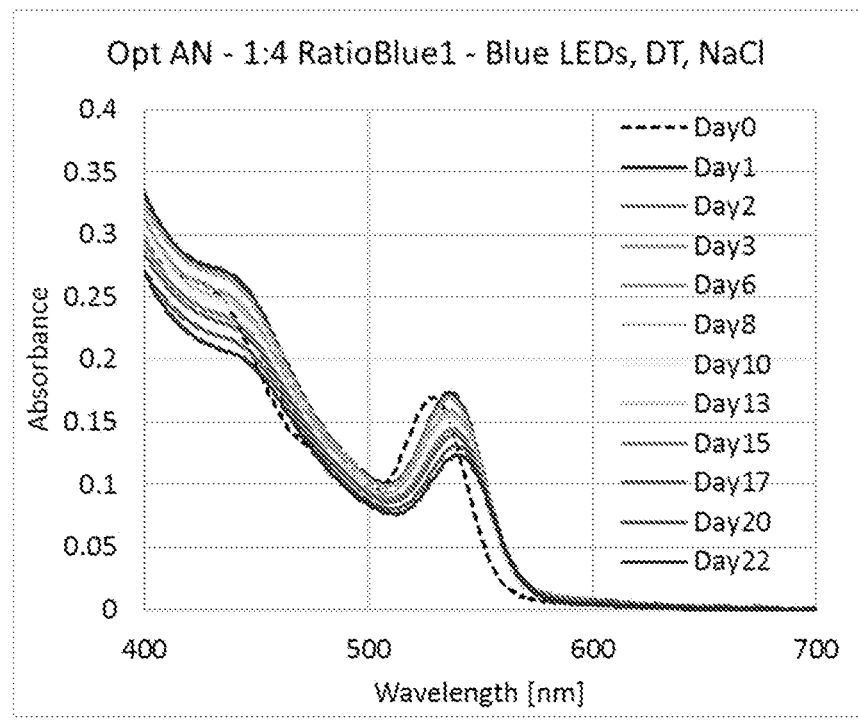

Blue (460 nm) LED light samples showing a 1:1 ratio sample set compared to a 1:4 ratio sample set under ~300,000 lux total illustrates similar results as with other wavelength lights. Sample set L with 2 samples at 1:1 ratio is shown in FIG. 14A. Sample set AN with 3 samples at 1:4 ratio is shown in FIG. 14B. Feedstock loading for both sets were run at 10 mM $Na_2S_2O_4$ target.

The spectral data show that the 1:1 ratio samples were nearly fully precipitated within 1 day of light while the 1:4 ratio samples were still abundantly in solution after 22 days of light comparing FIGS. 14A and 14B.

Figure 15A:
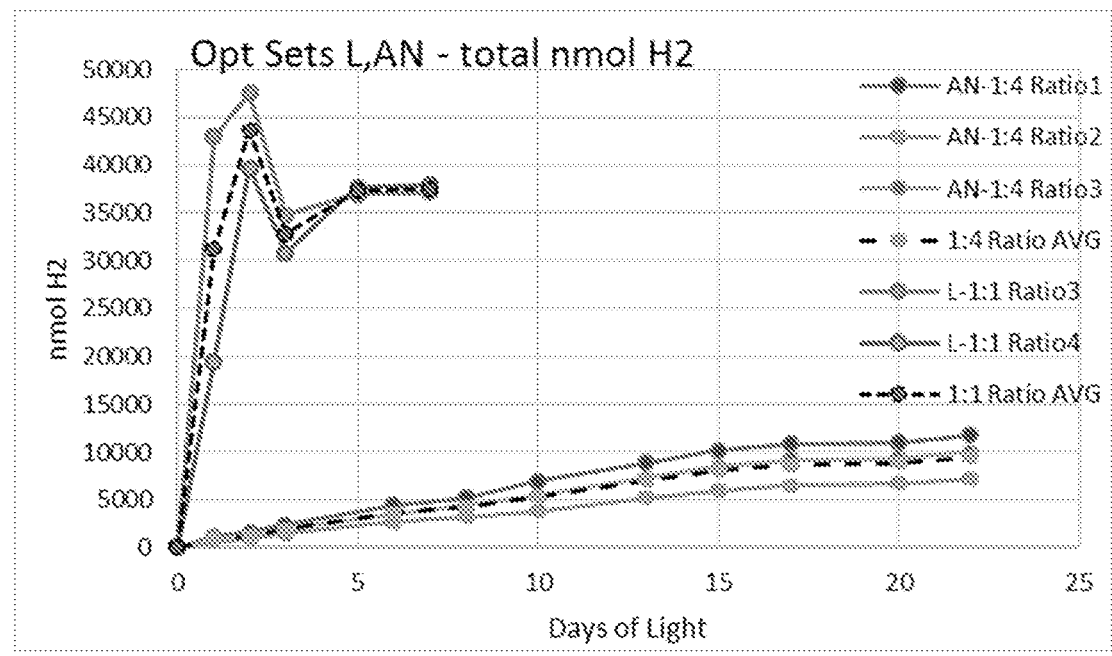
FIGS. 15A and 15B. The hydrogen generation results show a high burst rate for the 1:1 sample set. The 1:4 show a sustained steady rate.

In FIG. 15A, it is noted that although the 1:1 ratio samples have a much higher rate of hydrogen generation, the rate is unsustainable and the catalyst is non-homogenous within a few days of light. The 1:4 ratio samples have almost no spike rate of generation and start immediately into a sustained rate of hydrogen generation within 24 hours of light.

Figure 15B:
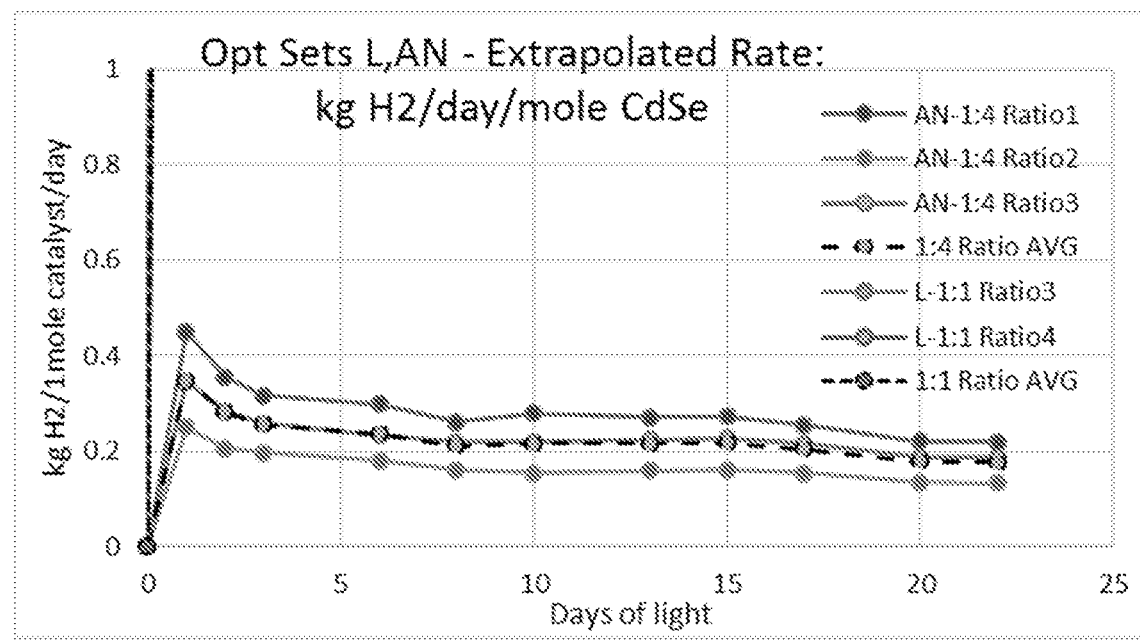

In conclusion, for the purpose of extending the duration of the reaction, the higher the excess amount of NafY-FeMo-co to the CdSe results in longer sustained electronic properties and homogeneity of solution as is shown in FIG. 15B. Lower rates of hydrogen do result however increasing the concentration of the feedstock may increase the sustained rates of production.

Figure 16A:
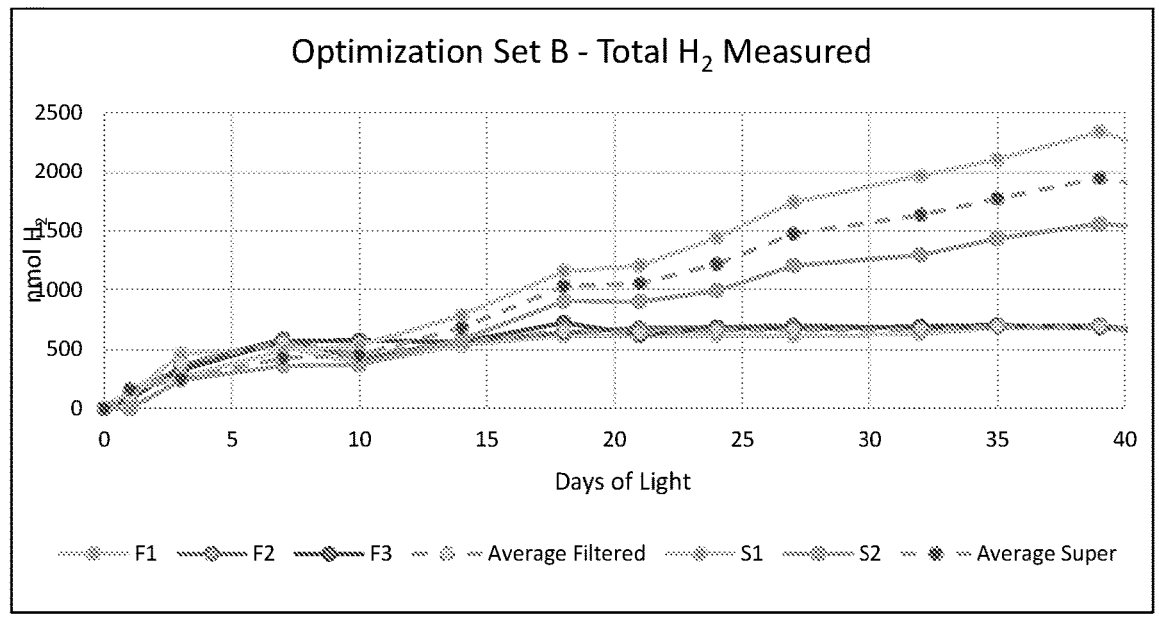
FIG. 16A. Duration sample sets in the early optimization phase demonstrated sustained hydrogen production for 39 days.
Figure 16B:
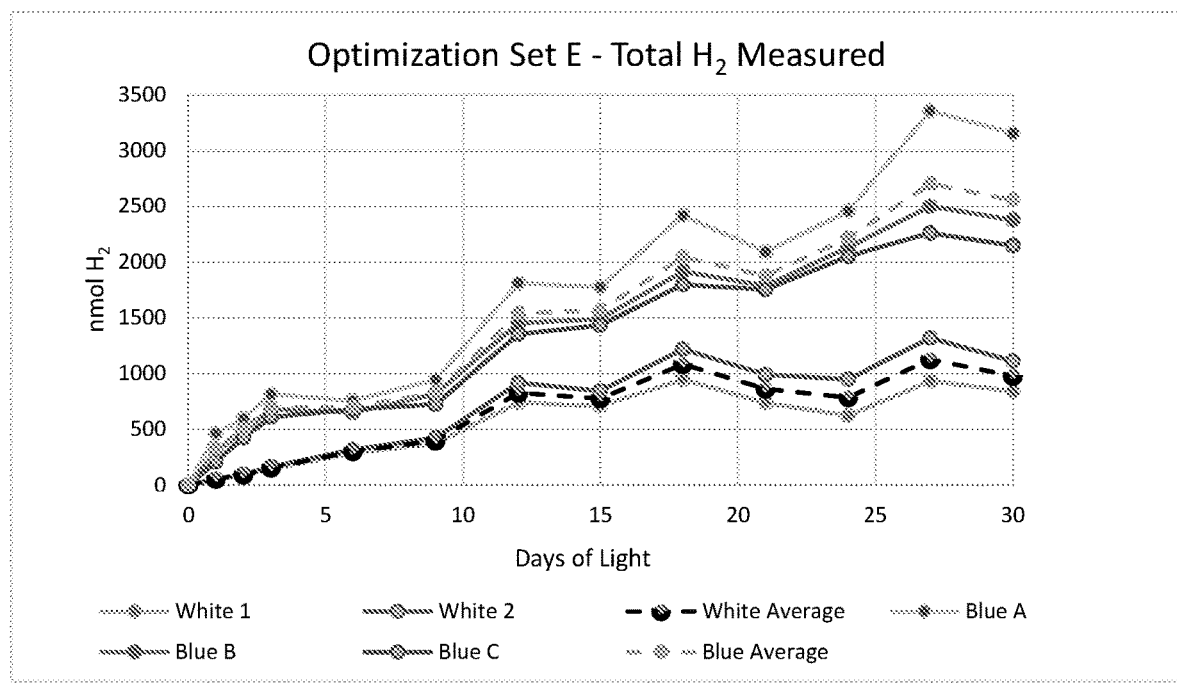
FIG. 16B. Continuous hydrogen generation in both sample sets in front of white LED lights and blue LED lights for 30 days.

Example 6. Demonstration of Continuous Hydrogen Production for Extended Time In an embodiment, extending the duration of the hydrogen generation may be a priority for commercial viability. In one study, Optimization Set B, the experimental conditions were as before. The plot in FIG. 16A shows a continuous steady rate of production until day 39. In Optimization Set E shown as the plot in FIG. 16B, the continuous steady rate of production was demonstrated for 30 days. One impressive and surprising feature of this system is its longevity compared to other photo-catalytic systems with enzyme components. When hydrogen production with biohybrid photo-catalytic systems are measured in minutes or hours (11, 12) as is seen in scientific literature, in contrast the CdSe-NafY-FeMo-co system has the ability to run for multiple weeks. The hydrogen production may cease when the electron or proton donor runs out or the catalyst precipitates. In an embodiment, additional loading of the present proton donor—spiking of $Na_2S_2O_4$, may over a period of time jeopardize the integrity of the catalytic system.

Figure 17A:
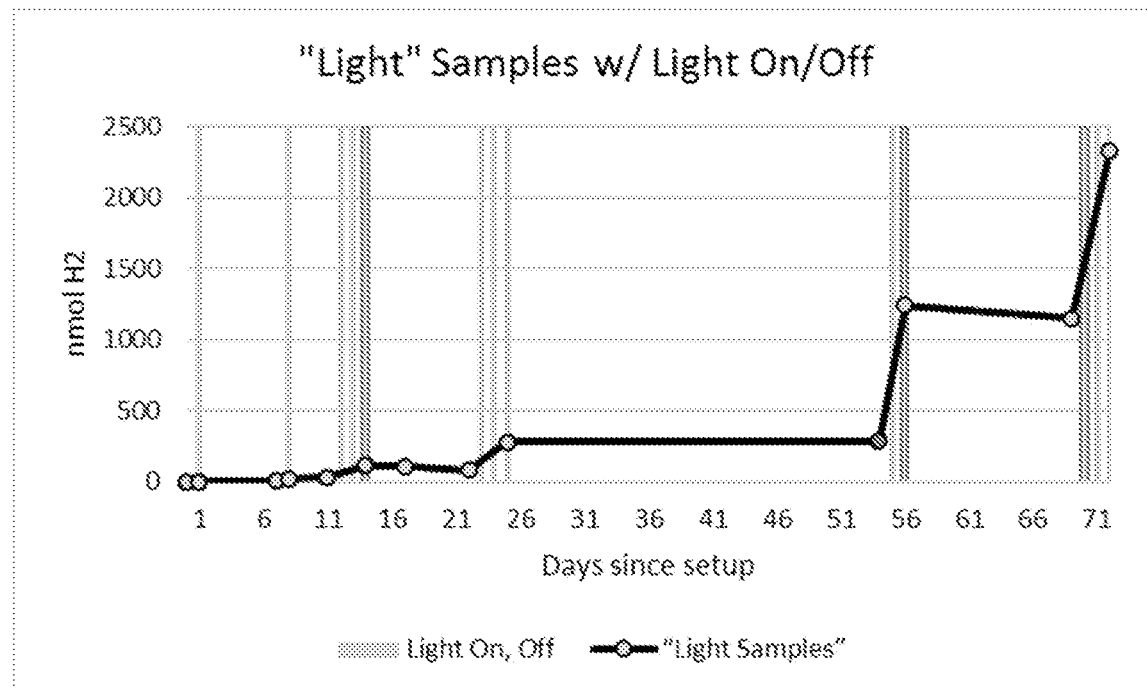
FIG. 17A. Sample set in front of broad-spectrum halogen light demonstrating ability of system to be switched "on" and "off." Sample conditions were 2 μM CdSe, 2 μM NafY-FeMo-co, 2 mM $Na_2S_2O_4$. The first plot shows hydrogen produced in samples vs days since setup where these samples were put in front of the light and then removed to the dark for the time period shown. Yellow bars indicate days when the samples were provided with light. The second plot shows hydrogen produced in the samples vs days of light exposure.
Figure 17A:
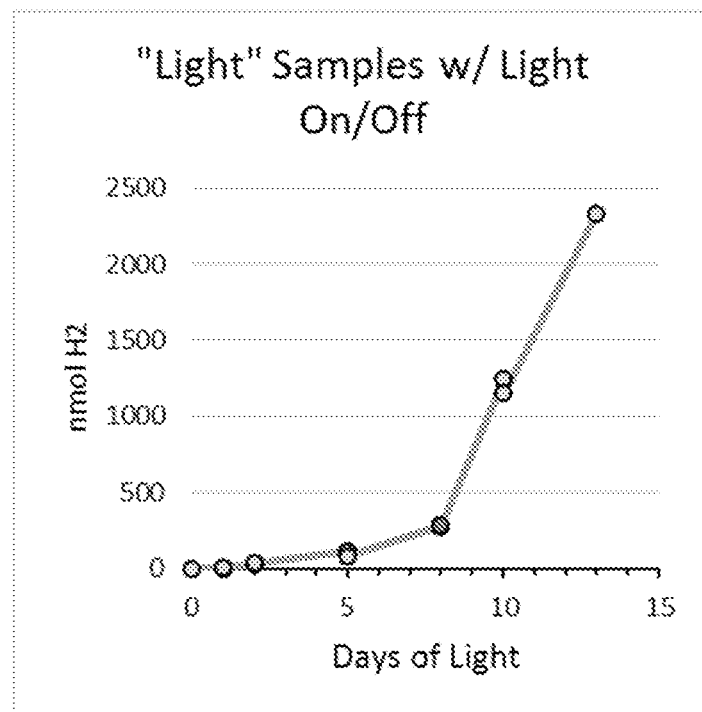

Example 7. Demonstration of Hydrogen Generation Experiment's Ability to be Turned On and Off and On Again Without Diminishing Hydrogen Production In an embodiment, addition or removal of the light source performs as an on-off switch. A set of samples were set up with these conditions: 2.0 µM CdSe-NafY-FeMo-co in 25 mM Tris, 2.0 mM $Na_2S_2O_4$. The samples were put in front of the broad spectrum halogen light for one day and then removed to the dark for five days. Throughout the time period, the samples were exposed to light and then dark. The data shows that intervals of no light of 2 to 53 days can halt hydrogen generation without loss of activity of the catalyst after light exposure is resumed. One "Day" is ~24 hr as shown in FIG. 17A and Table 2.

The "Light" samples have shown that hydrogen production can be initiated and ceased at varied stages of duration in hydrogen. The small amount of hydrogen created after "removing from light exposure" is likely due to the none immediate removal of light. The samples are left open to ambient light during GC analysis. A relaxation period is to be expected for the CdSe quantum dots as well.

Figure 17B:
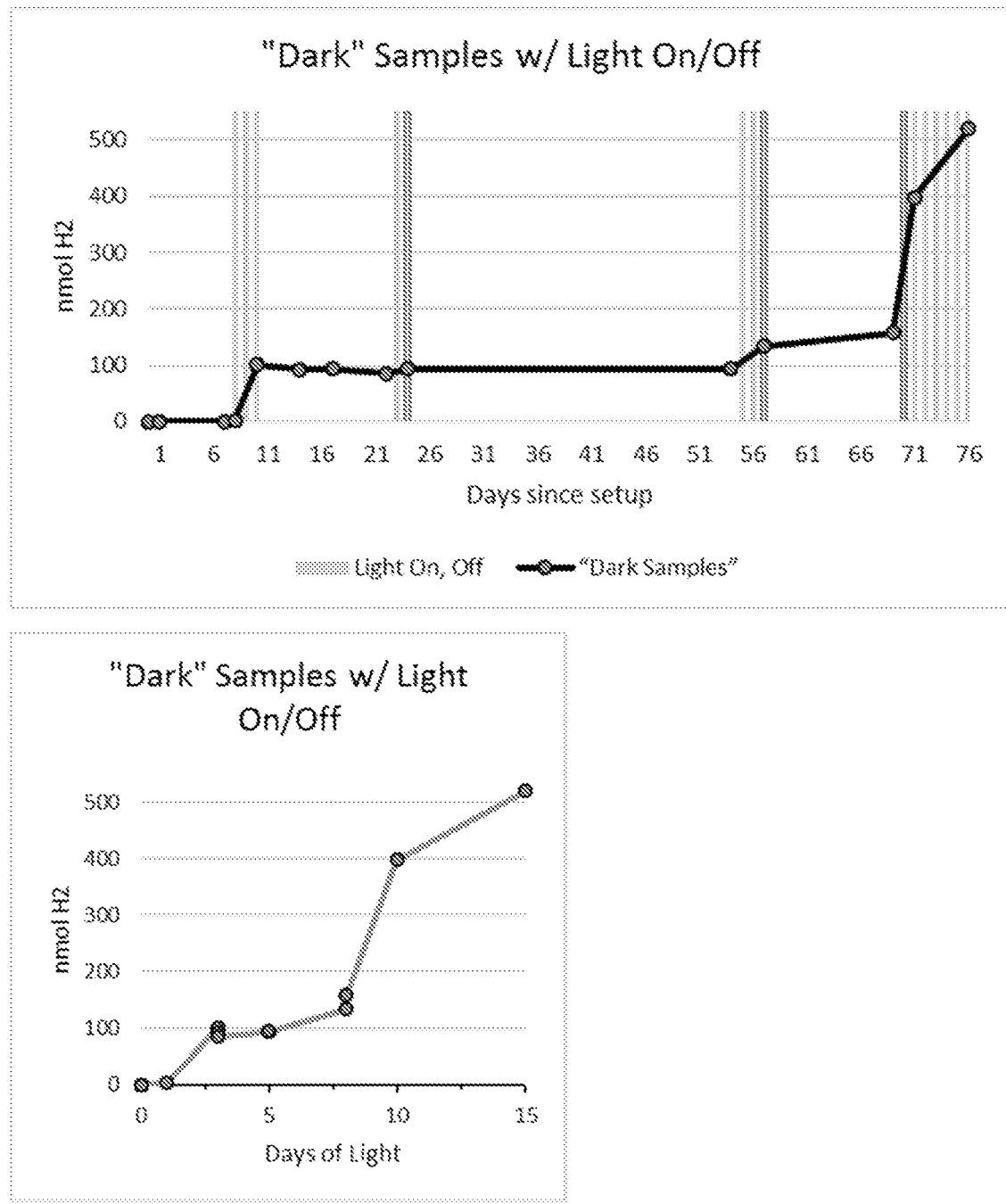
FIG. 17B. A sample set labeled "dark," with same reaction conditions were set up first in dark conditions and then exposed to light at different intervals from the samples showing in FIG. 17A.

The "Dark" samples have shown that no hydrogen production will occur if no light exposure is given to the catalytic mixture shown in FIG. 17B and Table 3. There is precedence that the reaction mixture has excellent shelf-life. After three days of light exposure the amount of hydrogen generated is quadruple what the "Light" samples had produced with the same amount of light exposure.

Incubation. In an embodiment, as in the previous samples, there appeared to be a benefit to the samples spending some time in the dark. Hydrogen production was enhanced for a period of time after the samples returned to the light.

Conclusions from these studies point to samples that have been exposed to light and initiate hydrogen production can be deactivated when light exposure is ceased. Furthermore, samples that have never seen light will not initiate hydrogen production without light exposure.

Some other samples that spent time away from the light are instructive.

Figure 18A:
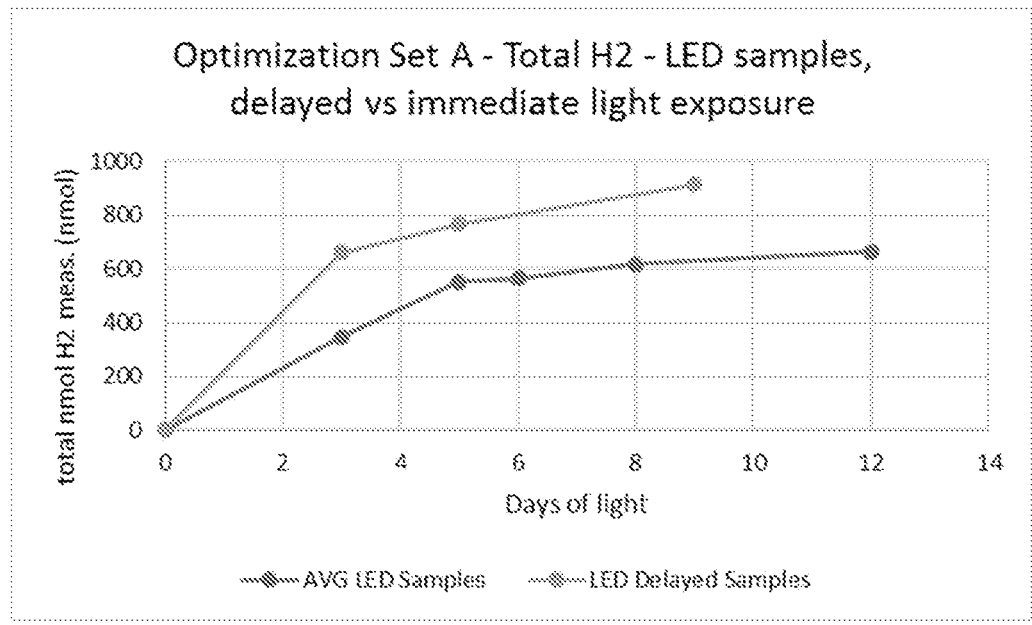
FIGS. 18A and 18B. Sample set up with these conditions, 2 μM CdSe, 2 μM NafY-FeMo-co, 2 mM $Na_2S_2O_4$. The samples that spent some time in the dark before light exposure had a small increase in hydrogen production.
Figure 18B:
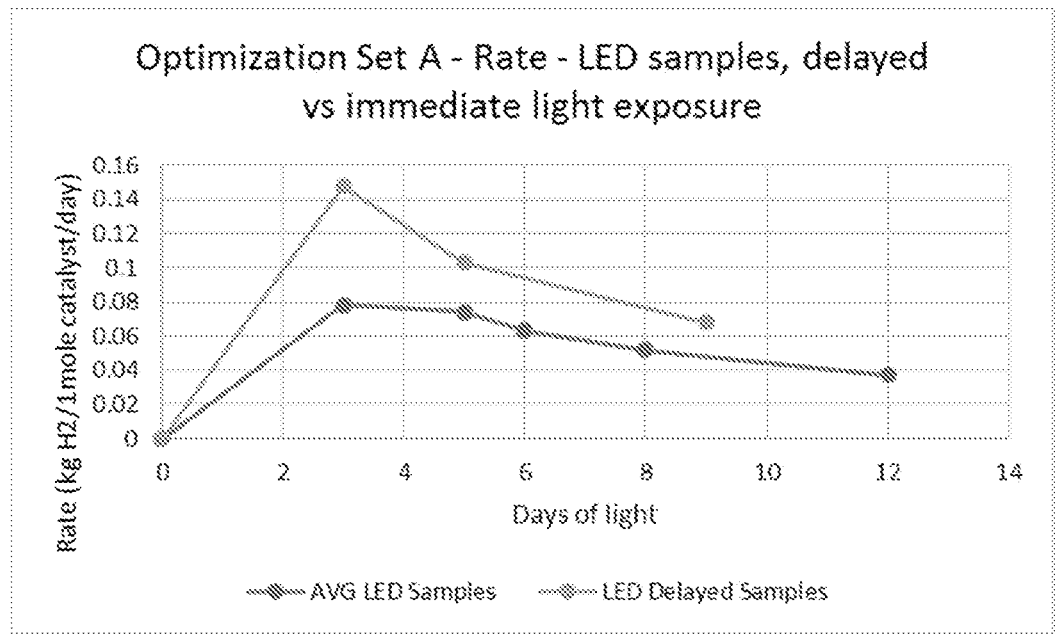

Optimization Set A Samples were set up to investigate the possible positive effects of incubation on hydrogen gas production. After setup, three samples (LED Samples) were placed on the broadband LED light (FIG. 18A), while two samples were put in the dark. One Delayed Sample was a non-responsive, so only one viable sample represents the Delayed Samples. The total hydrogen was measured at different time intervals. The rate of hydrogen production was calculated from total measured hydrogen, catalyst loading, time lapse as kg $H_2$ per mole of catalyst per day.

Delayed light exposure or initial incubation did produce more total hydrogen however since there was only one

TABLE 3

"Dark" Samples Data

| Days from Setup | Meas., Calc. Avg nmol H2 | Days of Dark | Days of Light | Days of Dark | Days of Light | Days of Dark | Days of Light | Days of Dark | Days of Light |
|---|---|---|---|---|---|---|---|---|---|
| 0 | 0 | 0 | | | | | | | |
| 1 | 0 | 1 | | | | | | | |
| 7 | 0 | 7 | | | | | | | |
| 8 | 3 | 7 | 1 | | | | | | |
| 10 | 100.6 | 7 | 3 | | | | | | |
| 14 | 92.0 | 7 | 3 | 4 | | | | | |
| 17 | 93.5 | 7 | 3 | 7 | | | | | |
| 22 | 84.8 | 7 | 3 | 12 | | | | | |
| 24 | 94.0 | 7 | 3 | 12 | 2 | | | | |
| 54 | 94* | 7 | 3 | 12 | 2 | 30 | | | |
| 57 | 134.3 | 7 | 3 | 12 | 2 | 30 | 3 | | |
| 69 | 157.9 | 7 | 3 | 12 | 2 | 30 | 3 | 13 | |
| 71 | 397.3 | 7 | 3 | 12 | 2 | 30 | 3 | 13 | 2 |
| 76 | 519.8 | 7 | 3 | 12 | 2 | 30 | 3 | 13 | 7 |

*value is assumed, not measured.

TABLE 2

"Light" Samples Data

| Days from Setup | Meas., Calc. Avg nmol H2 | Days of Light | Days of Dark | Days of Light | Days of Dark | Days of Light | Days of Dark | Days of Light | Days of Dark | Days of Light | Days of Dark | Days of Light |
|---|---|---|---|---|---|---|---|---|---|---|---|---|
| 0 | 0 | 0 | | | | | | | | | | |
| 1 | 1 | 1 | | | | | | | | | | |
| 7 | 8.7 | 1 | 6 | | | | | | | | | |
| 8 | 24.4 | 1 | 6 | 1 | | | | | | | | |
| 11 | 34.2 | 1 | 6 | 1 | 3 | | | | | | | |
| 14 | 112.2 | 1 | 6 | 1 | 3 | 3 | | | | | | |
| 17 | 106.6 | 1 | 6 | 1 | 3 | 3 | 3 | | | | | |
| 22 | 82.8 | 1 | 6 | 1 | 3 | 3 | 8 | | | | | |
| 25 | 279.5 | 1 | 6 | 1 | 3 | 3 | 8 | 3 | | | | |
| 54 | 279* | 1 | 6 | 1 | 3 | 3 | 8 | 3 | 29 | | | |
| 56 | 1242.4 | 1 | 6 | 1 | 3 | 3 | 8 | 3 | 29 | 2 | | |
| 69 | 1152.5 | 1 | 6 | 1 | 3 | 3 | 8 | 3 | 29 | 2 | 14 | |
| 72 | 2331.9 | 1 | 6 | 1 | 3 | 3 | 8 | 3 | 29 | 2 | 14 | 3 |

Figure 19A:
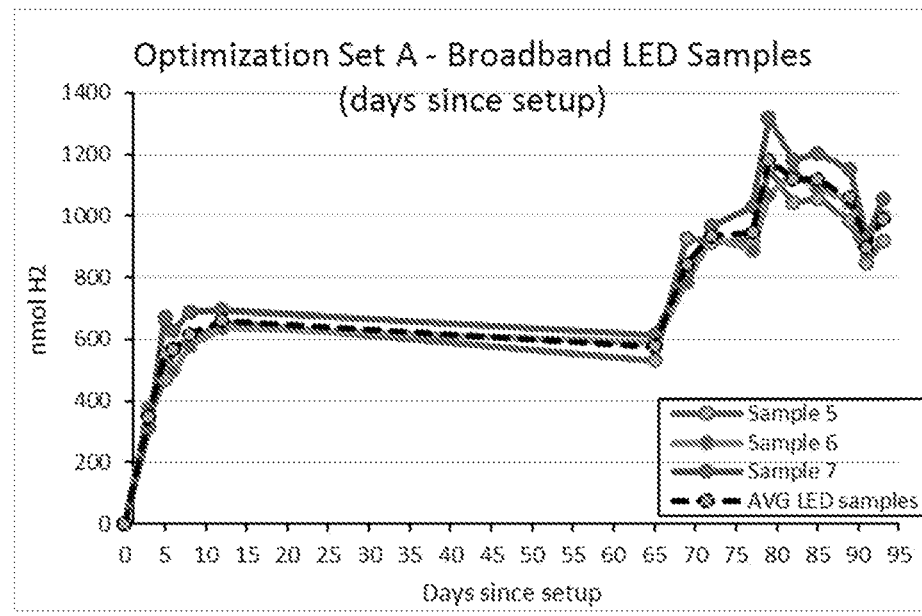
FIGS. 19A and 19B. Continuation plot of hydrogen generated by LED sample set shown in 1 FIGS. 8A and 18B. After 12 continuous days of light since set up, the samples were placed in darkness for 53 days then returned to light for further hydrogen generation.
Figure 19B:
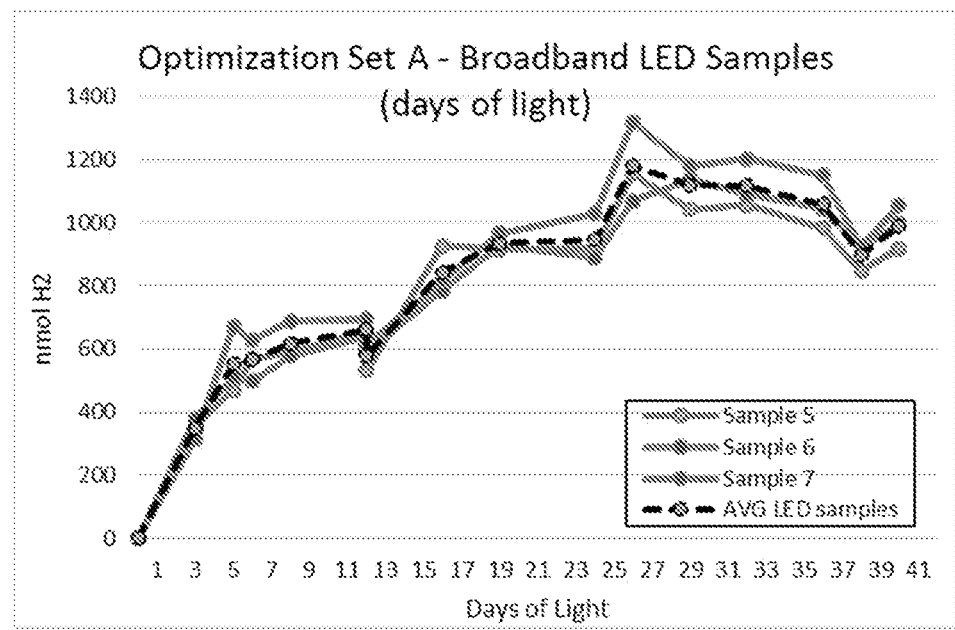

*value is assumed, not measured.

sample one cannot conclusively say that incubation or spending time in the dark enhances hydrogen production. Later, the LED samples were removed from light, put into darkness for 53 days. Hydrogen generation was resumed when the samples were provided light again after 53 days of darkness. The total measured hydrogen is graphed in the following plots. FIG. 19A shows total hydrogen vs days since setup. Note that no significant hydrogen was produced over the 53 days of darkness. Plot in FIG. 19B is total hydrogen vs days of light. Note that the hydrogen production appears seamless when the interval of the dormancy period is removed from the plot.

Figure 20A:
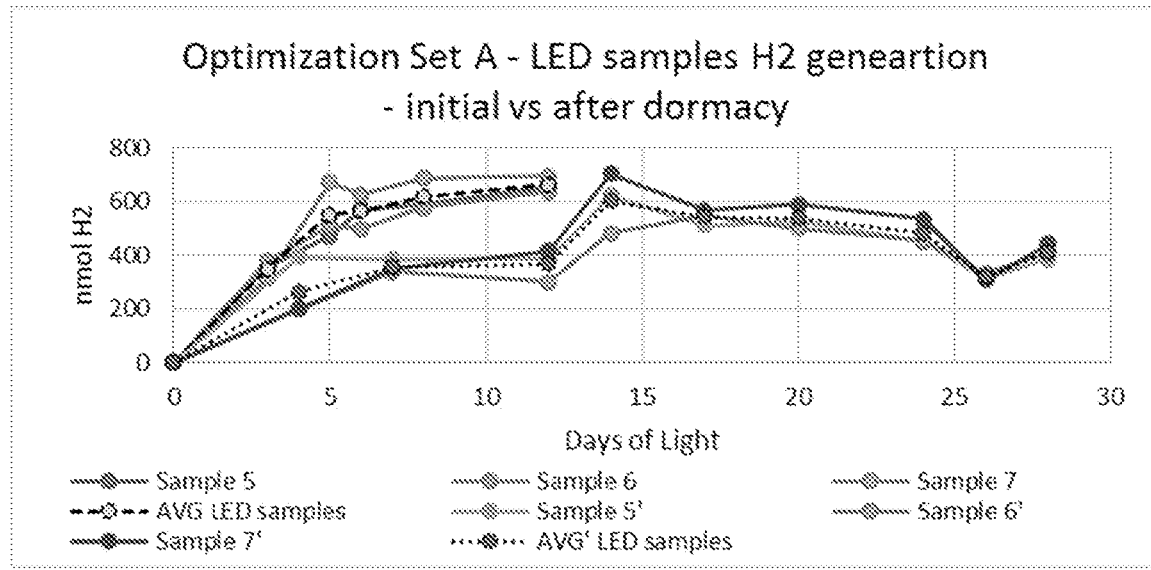
FIGS. 20A and 20B. Further analysis of data from FIGS. 19A, 19B with the sample set that underwent 53 days of darkness. The sample set did continue to produce hydrogen after resuming light exposure, but the rate was diminished vs the starting production rate of the same samples. Sample conditions were 2 μM CdSe, 2 μM NafY-FeMo-co, 2 mM $Na_2S_2O_4$.
Figure 20B:
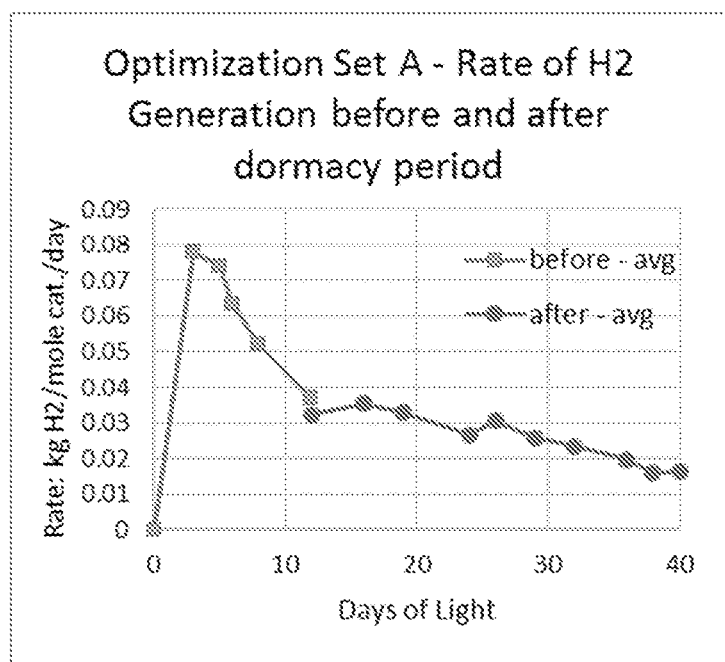

Comparing the amount of hydrogen produced before and after the 53-day dormancy, plotting the total amount of hydrogen produced vs days of light and treating Day 65 as a second Day 0 (setup day), the following graph results (FIG. 20A). Note that the overall rate of hydrogen production after dormancy was less than the initial rate of production with initial light exposure after the true setup. When comparing the rate of production just before the samples went into dormancy vs just after (FIG. 20B), there is a small increase in rate. However, this trend is common for most sample sets where the initial rate of hydrogen generation tapers after an initial decrease.

In conclusion, a dark-incubation or dormancy period, defined as having the samples in darkness immediately after setup with feedstock present, did not result in higher producing hydrogen generation. A dormancy period of 53 days (mid experiment incubation period), also did not increase hydrogen generation rates; however, sample set up followed by time spent in the dark and time in the dark for 53 days, surprisingly does not diminish the hydrogen generation capability of the catalyst.

Incubation in the dark produced some interesting spectral data. It has been recognized that higher energy (shorter wavelength) light can damage the nanoparticles and therefore jeopardize the function of the catalyst for long-term hydrogen generation. Interesting data from samples put in front of the most energetic LED light source comparing samples given some incubation time and those put immediately in front of the LEDs after experimental set up present the following data.

Figure 21A:
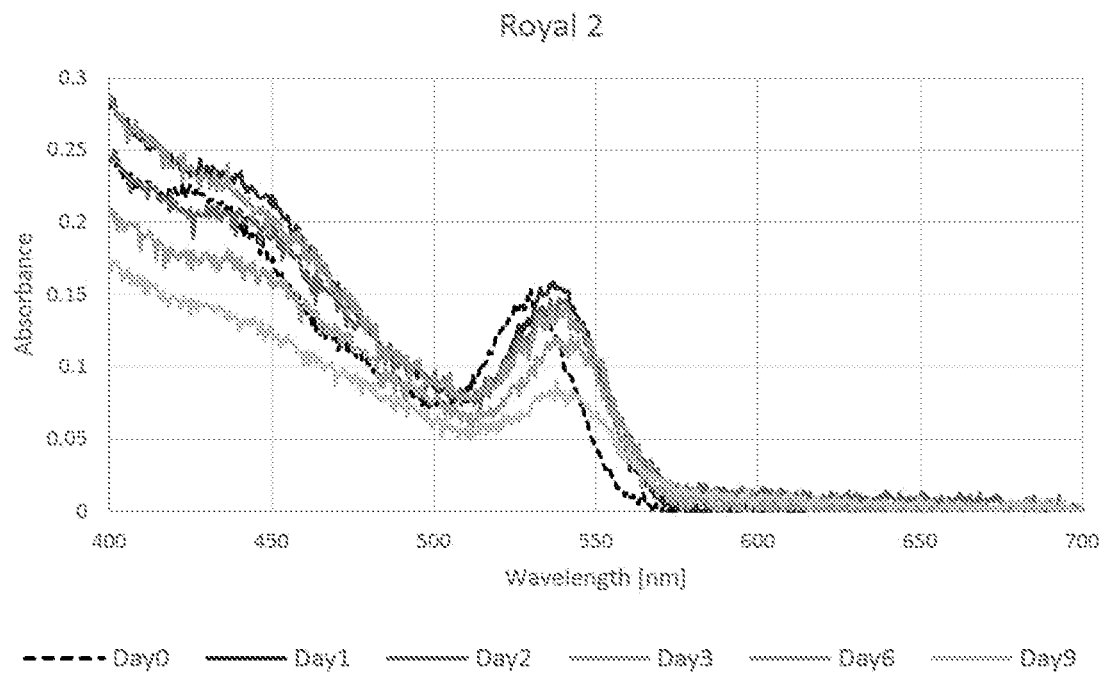
FIGS. 21A, 21B and 21C. Contrasting UV-vis data from sample sets that were in front of royal blue LED lights. In front of the high energy and high intensity light, the samples shown in FIG. 21A show diminished absorbance by Day 9.
Figure 21B:
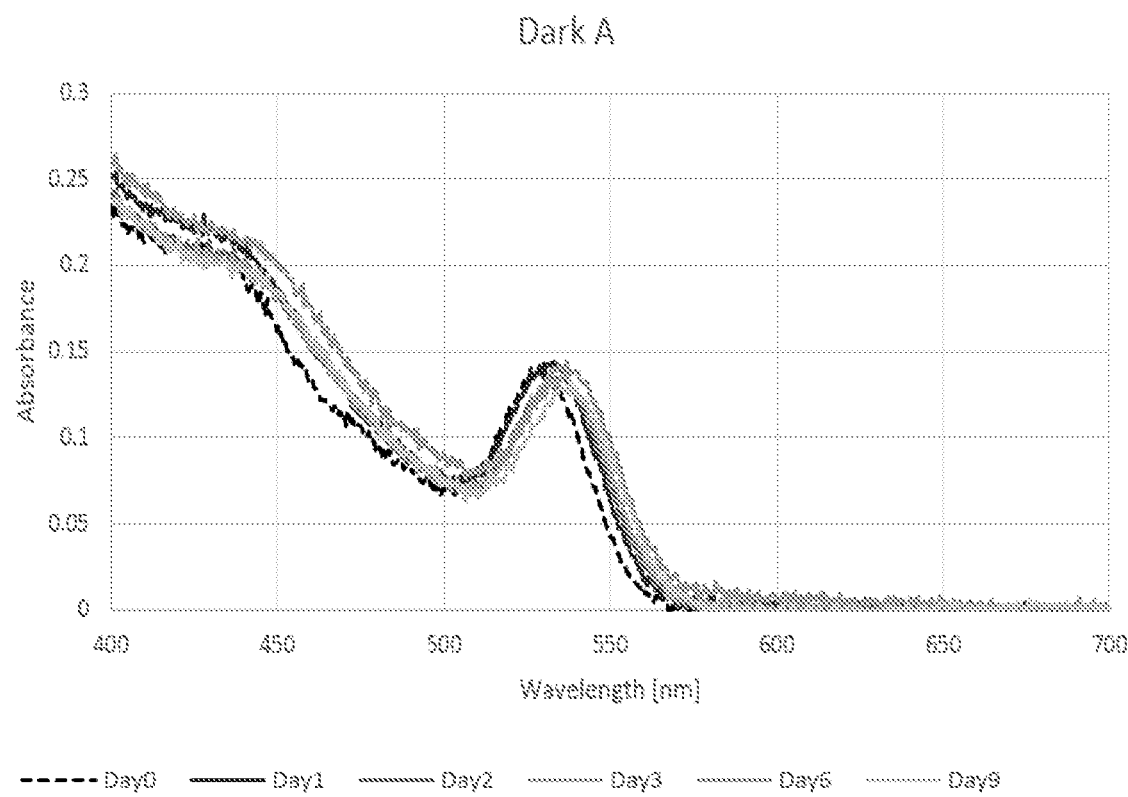
Figure 21C:
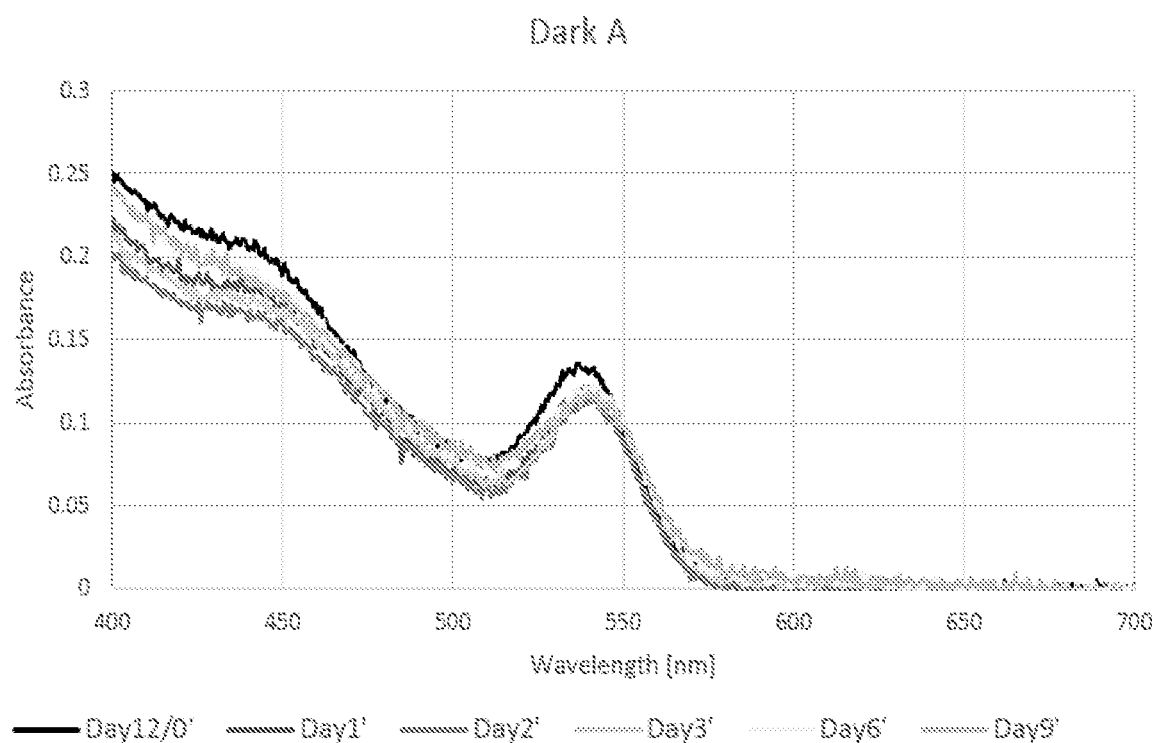

There were three samples placed at Royal Blue LEDs immediately after setup (G samples seen in FIG. 21A). Three samples were placed into darkness immediately after setup (G' samples seen in FIG. 21B). On Day-12 from setup, the Dark samples were taken from darkness and placed in front of Royal Blue LEDs (FIG. 21C).

G Samples had significant spectral changes within first 9 days of light exposure and hydrogen generation.

G' Samples in darkness had red shift, but no loss in absorbance. The G' samples maintained spectral integrity once given 9 days of light.

Figure 22A:
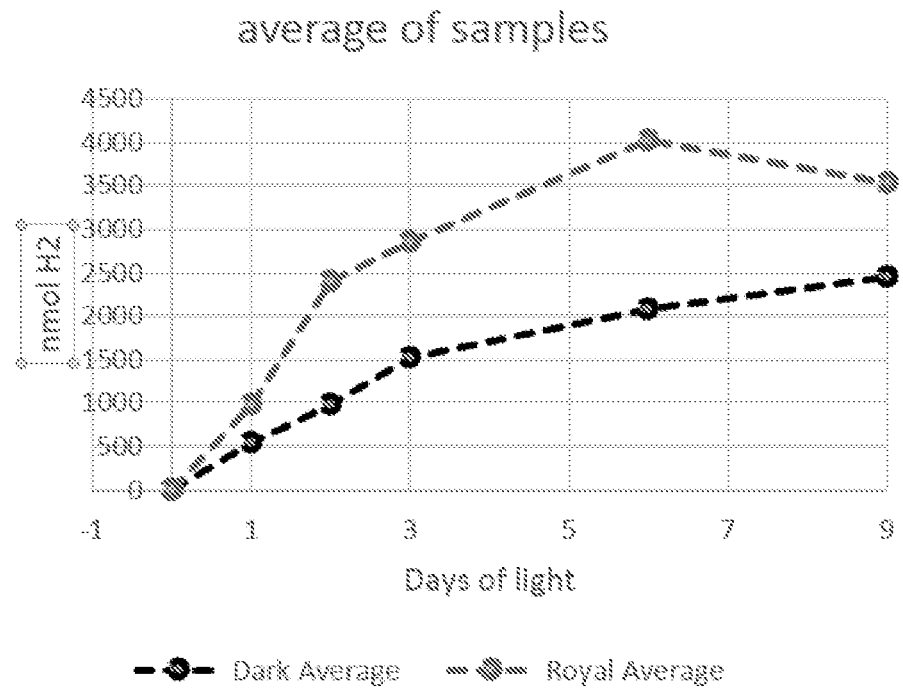
FIGS. 22A and 22B. Hydrogen generation for the samples shown in FIGS. 21A, 21B, and 21C. Incubation in the dark may have contributed to maintaining spectral integrity; however, these samples produced less hydrogen overall.
Figure 22B:
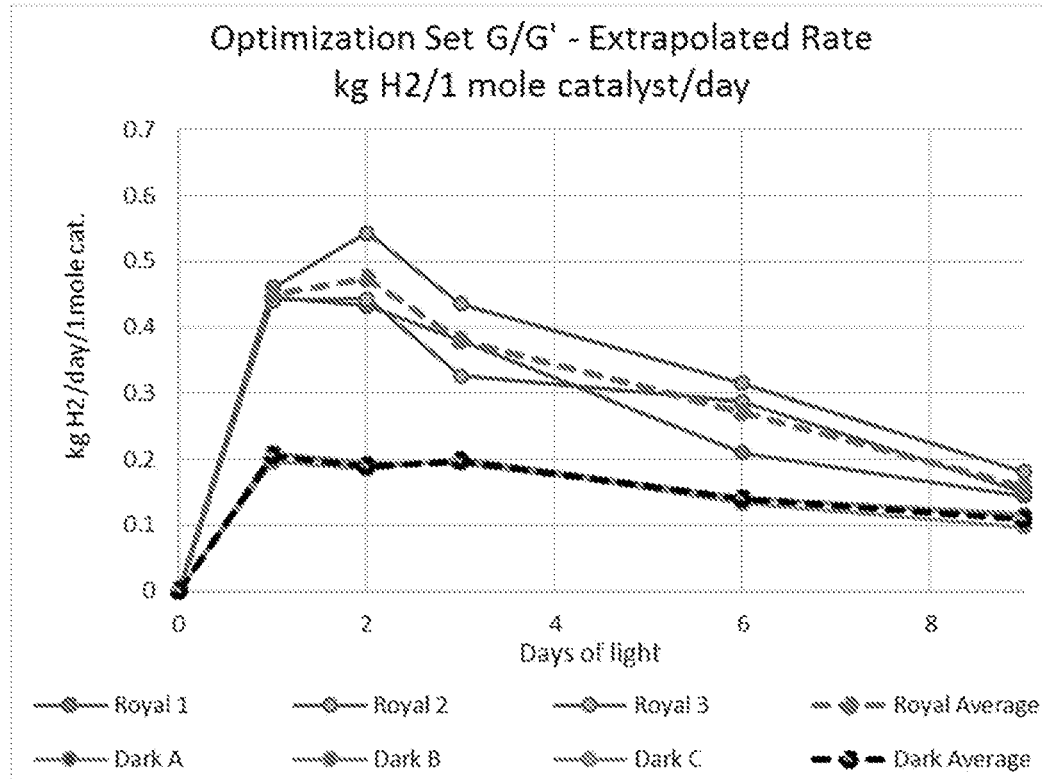

Comparison of the hydrogen generation of these sets are of interest; however, the samples that went directly onto the light for hydrogen generation outperformed the samples that were in darkness/incubating for 12 days prior to light exposure/hydrogen generation (FIGS. 22A and 22B).

Note: Colored precipitate started to appear on Day-3 for Samples Royal Blue 1, 2, 3. Culminated in ribbon-like deposit at rim. However, the Dark samples when placed at the Royal Blue LEDs colored precipitate was not observed through the 9 days of monitoring.

In conclusion, there was no increase in rate of hydrogen generation observed for samples that are incubated in darkness for 12 days; however, the samples spending time in darkness showed spectral integrity was maintained and therefore the likely benefit of incubation would be effective in long-term stability for maintaining homogeneity.

Figure 23A:
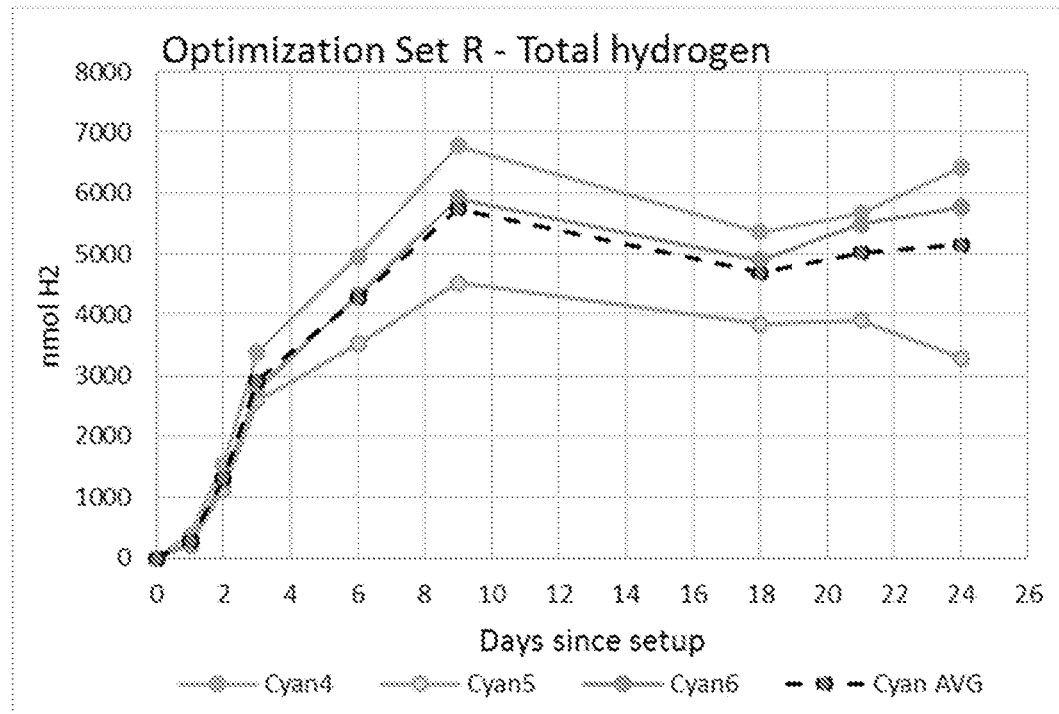
FIGS. 23A and 23B. More data for from hydrogen producing from sample sets given a break from light exposure, ceasing hydrogen production. These samples were in front of cyan lights.
Figure 23B:
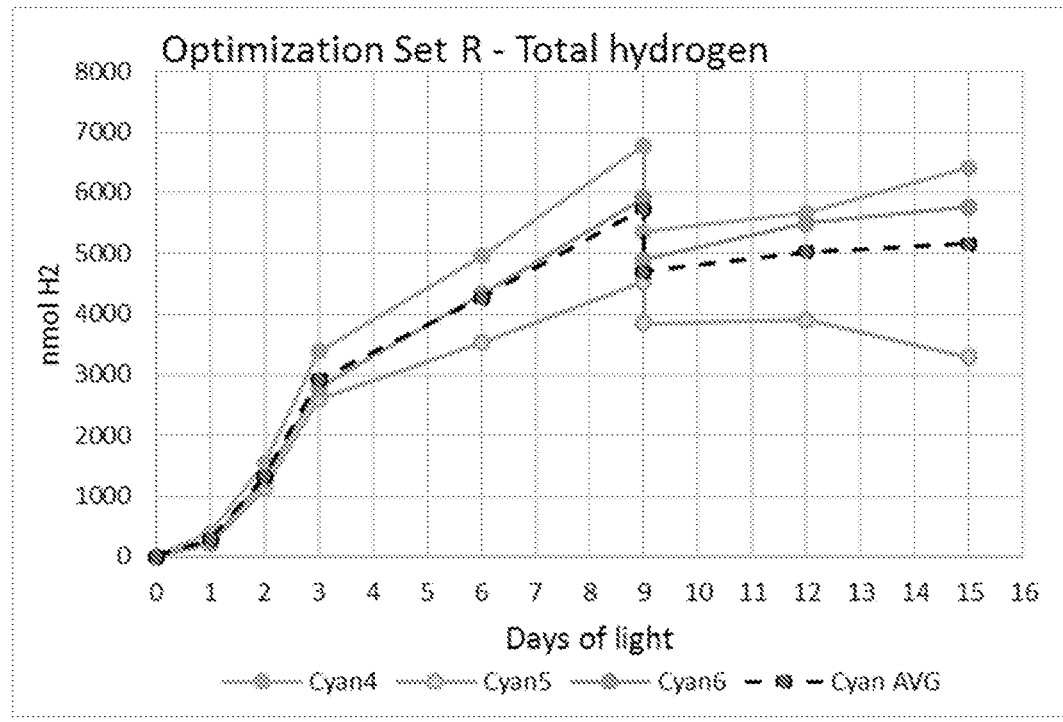

More data from various sample sets point to the conclusion that spending time in a dormant state or in the darkness do not impede hydrogen production once the samples are exposed to the light. This applies to different wavelength LED lights as observed to these samples in Set R that were put in front of cyan LED lights (510 nm). Samples were placed in front of Cyan LEDs for hydrogen generation of 9 days. Then the samples were placed in darkness for 9 days. The samples were returned to the Cyan LEDs for 6 more days. Total hydrogen produced is shown in FIG. 23A. The days of light compared with hydrogen production is shown in FIG. 23B. Interestingly, spending time in the darkness does not diminish sample sets from producing hydrogen once they are returned to the light.

In conclusion, the 9-day lapse in light did not affect the overall production of hydrogen. Note that the observed drop in overall hydrogen measured is likely due to a leak in the septum.

Figure 24A:
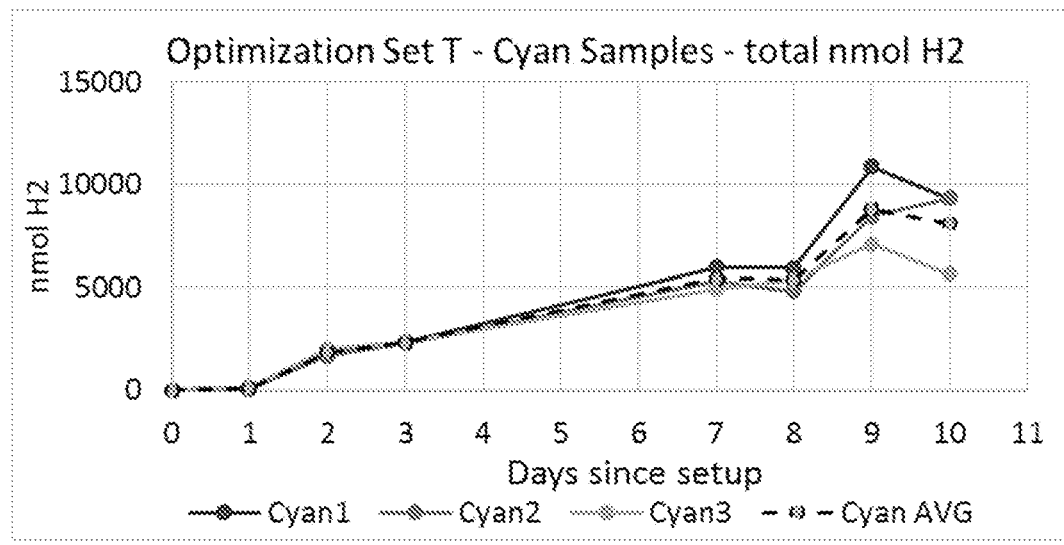
FIGS. 24A and 24B. Data demonstrating that spending three days in darkness in the middle of a 10 day hydrogen generation experiment does not impede hydrogen generation.
Figure 24B:
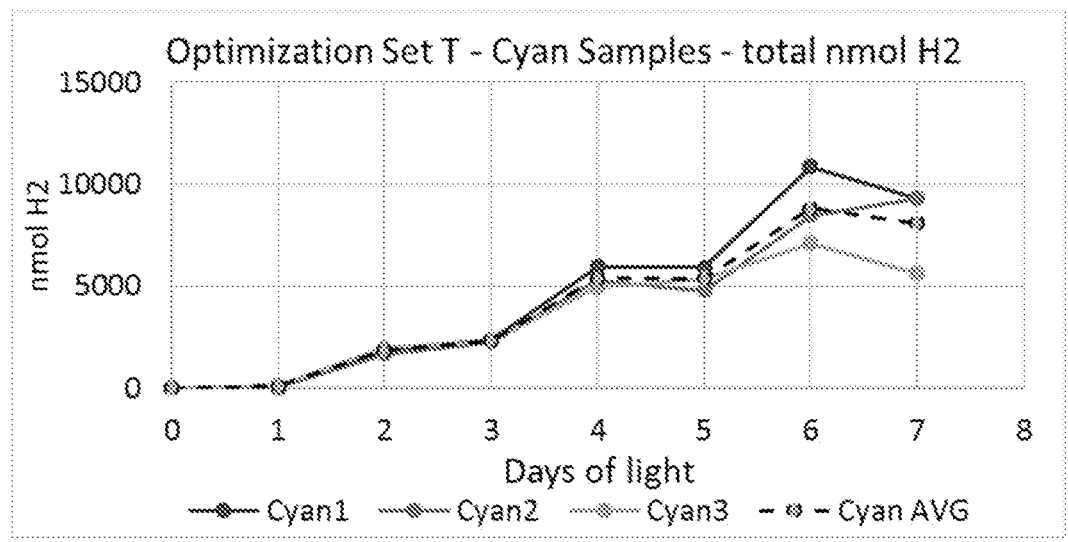

Once more, cyan lights demonstrated repeatable data pointing to varying amount of time spent in darkness does not impair hydrogen production once they are returned to in front of the LED lights. Samples in front of Cyan LEDs were provided light for three continuous days immediately after setup. Then the samples were in darkness for three days, returned to lights for four days, and measured after more light exposure. No measurement was taken after the duration of darkness. The following total amount of hydrogen was produced and plotted vs total days of light (FIG. 24A) or days since setup (FIG. 24B).

In conclusion, three days of darkness in the middle of a 10-day hydrogen generation experiment does not hinder the catalyst lifecycle of hydrogen generation.

Finally, as has been detailed, enhancing the duration of the hydrogen generation is performed by increasing the NafY-FeMo-co concentration and thereby setting a 1:3 ratio CdSe: NafY-FeMo-co in the catalyst. It's interesting to observe altered ratio samples undergoing a period of darkness and then a return to light conditions. Samples were placed in front of cyan LEDS immediately after set up. After 9 days of light the samples were in the dark for 19 days. The samples were returned to the LEDs for 4 days then back to the dark for three days. After 4 more days of light the experiment was ceased.

Figure 25A:
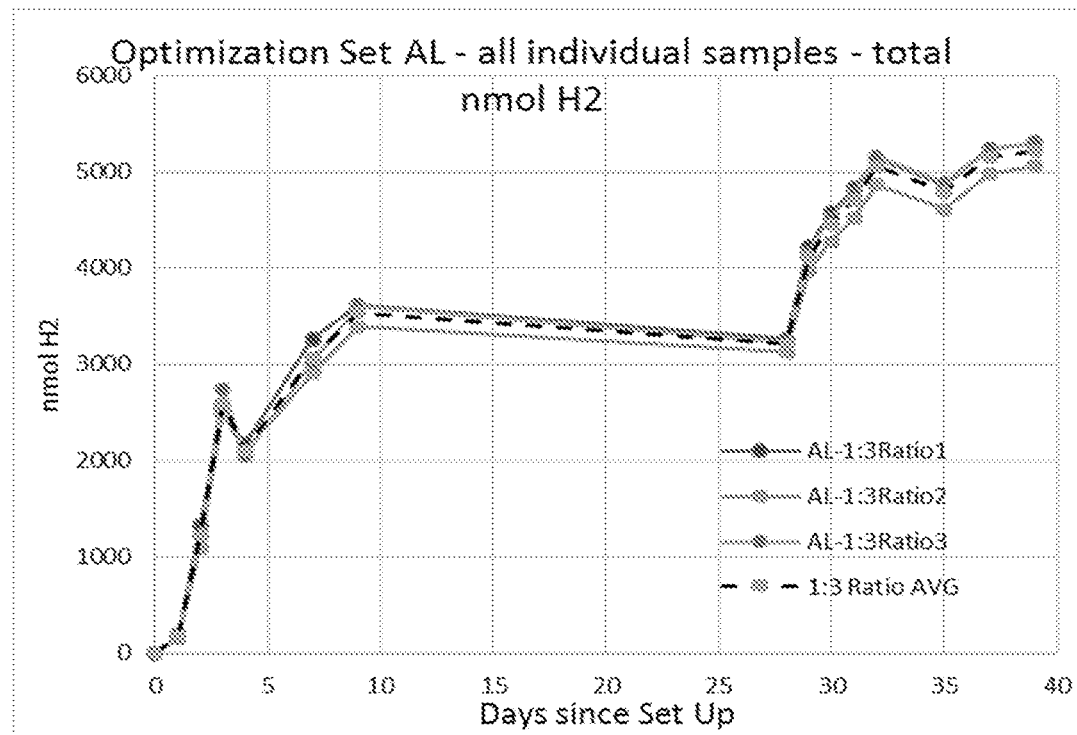
FIGS. 25A, 25B, and 25C. Sample set with 1:3 ratio between CdSe and NafY-FeMo-co in front of high energy blue LED lights.
Figure 25B:
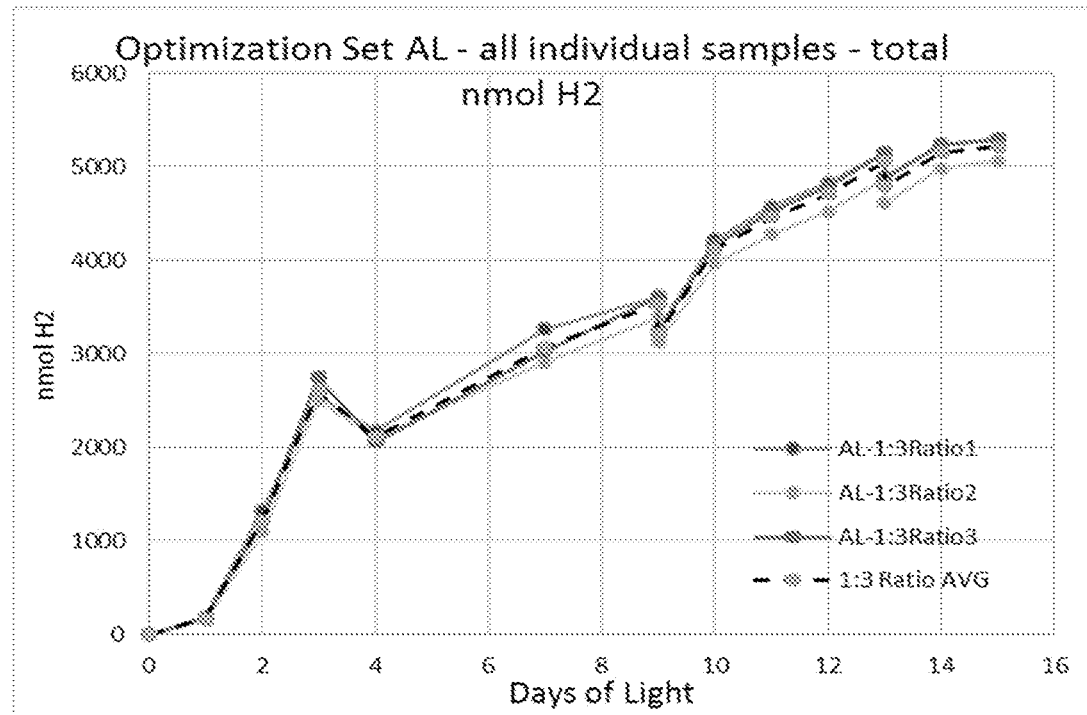
Figure 25C:
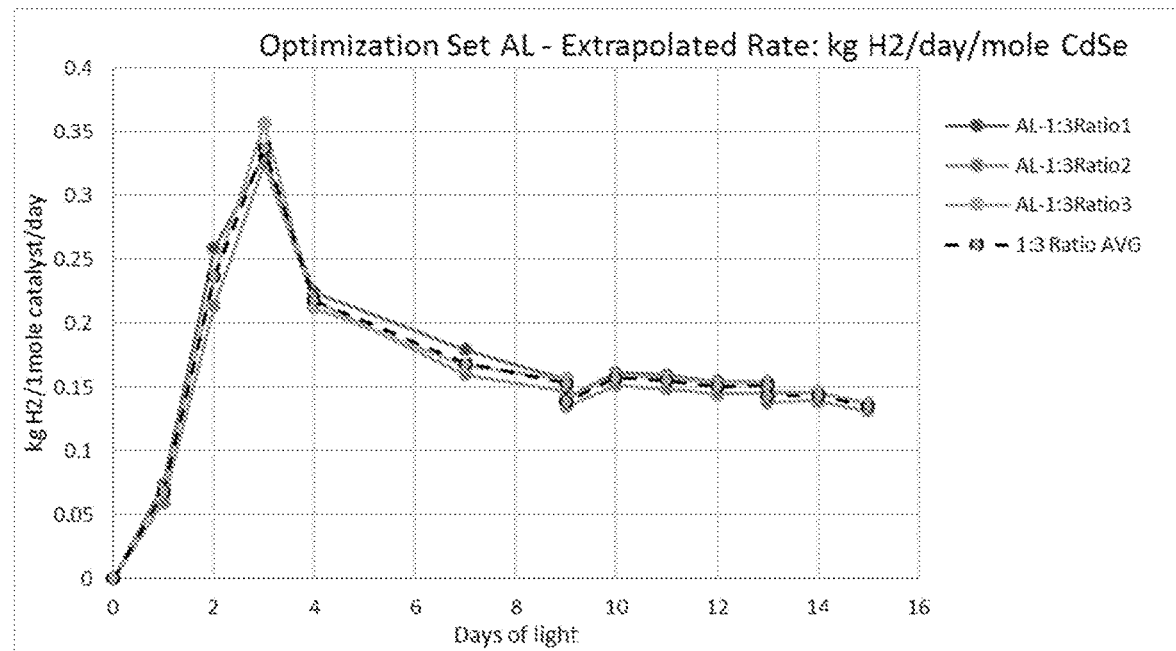

No significant loss in hydrogen production was observed. The steady decline/plateau of rate was observed regardless of the periods of no light and no hydrogen generation. FIGS. 25A and 25B shown total amount of hydrogen produced. FIG. 25C tracks the rate of hydrogen production. The effects of the altered ratio can be seen in the rate after then initial high rate is observed typically in the first 24 hours. Time spent in darkness during the experimental run did not impede hydrogen production once samples were returned to the lights. Additionally, the positive effects of steady hydrogen production arising from the increased ratio are demonstrated in the steady state rates of production.

In conclusion, the periods of darkness of 19 days, 3 days, or repeat periods of darkness, do not affect the overall trend/lifecycle of the catalyst that occurs during hydrogen generation.

Example 8. Investigation of Alternative Proton Sources

Figure 26:
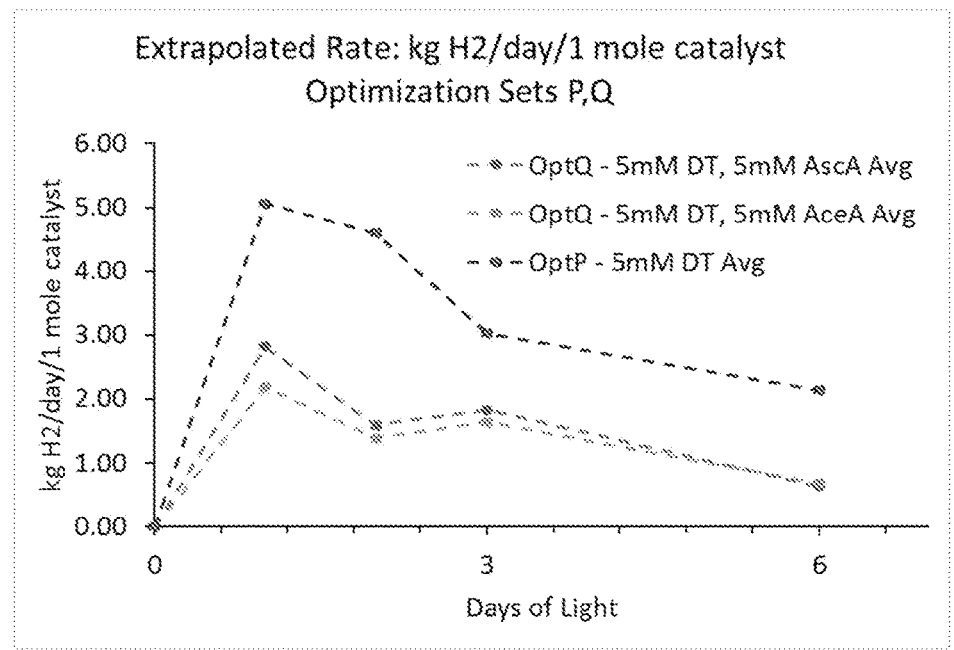
FIG. 26. Hydrogen production for various sample sets with sodium dithionite alone and additional sets with sodium dithionite plus ascorbic acid and sodium dithionite plus acetic acid. All samples were in front of high intensity blue lights.

Investigation of alternative proton sources was performed in experiments with addition of acetic acid and ascorbic acid. Sodium dithionite vs sodium dithionite with ascorbic acid vs sodium dithionite with acetic acid illuminated with high intensity blue LED lights. The plot in FIG. 26 shows the CdSe-NafY-FeMo-co system (2 µM). All samples have 5 mM of sodium dithionite (DT). Samples OptP have only DT loaded. Samples OptQ have DT and a weak acid: AscA=5 mM ascorbic acid, AceA=5 mM acetic acid. Note that sodium dithionite loading alone produces a prominent burst/non-sustained rate of hydrogen production while both ascorbic acid and acid in addition to the dithionite load behave similarly as a sustained rate of hydrogen production.

Figure 27:
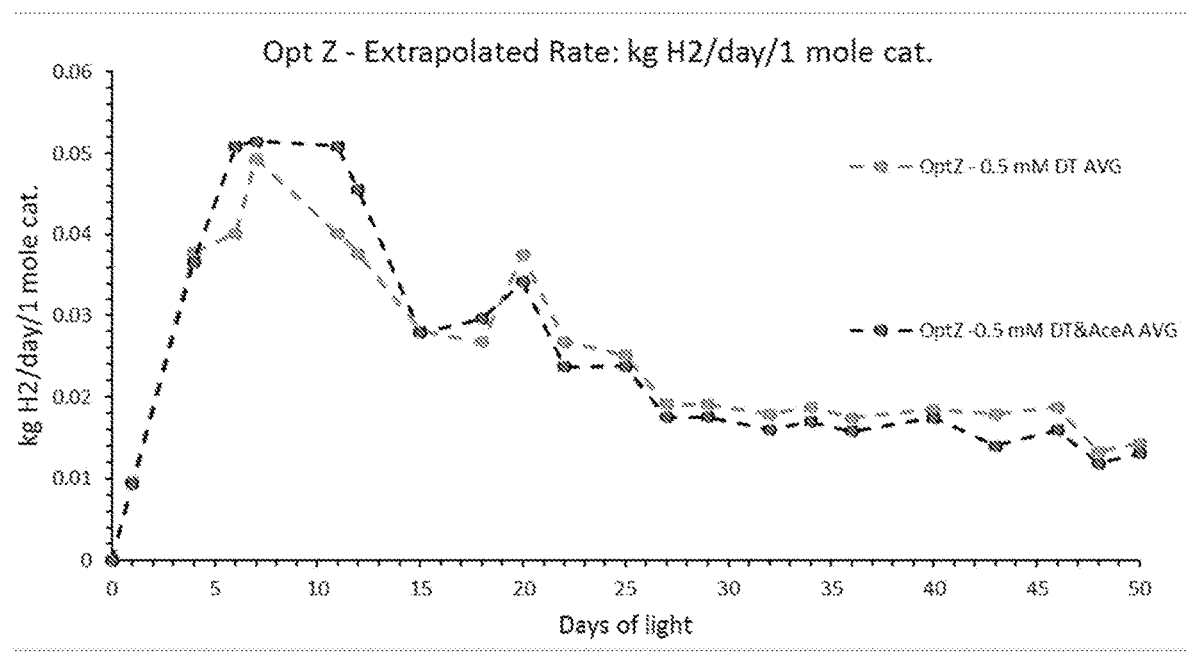
FIG. 27. Hydrogen production in two sample sets with less intense blue light and low amounts of sodium dithionite and sodium dithionite/acetic acid loading. A sustained rate of hydrogen production was observed. Reaction conditions 2 µM CdSe, 2 µM NafY-FeMo-co, and 0.5 mM $Na_2S_2O_4$ in one set and 2 µM CdSe, 2 µM NafY-FeMo-co, 0.5 mM $Na_2S_2O_4$, and 0.5 mM acetic acid in the other.

Samples were set up and put in front of lesser intensity blue lights to investigate the use of acetic acid further. All catalyst loadings are 1:1 ratio of CdSe:NafY-FeMo-co. All samples exposed to Blue LEDs (~460 nm) of ~80,000 lux total. Samples OptZ-DT are loaded with only 0.5 mM sodium dithionite. Samples OptZ-DT&AceA are loaded with 0.5 mM sodium dithionite and 0.5 mM acetic acid. FIG. 27 shows that under subdued light conditions and lesser dithionite loading the samples behave similarly with vs without acetic acid present and are able to establish a sustained rate of hydrogen generation.

Example 9. Stability of Hydrogen Generation Experiment Enhanced by Presence of Protein Component In embodiments, stability of system enhanced by enzyme component presence was demonstrated in each sample set. The controls with CdSe nanoparticles (2 µM) with added sodium dithionite (2 mM), same concentrations as the hydrogen generation samples, in each sample set have precipitated within the first 24 hours. The enzyme component stabilized the CdSe-NafY-FeMo-co system and kept it operational toward hydrogen production. In embodiments, controls with added NafY alone did not produce hydrogen and precipitated at a slower pace than the control samples with only CdSe. The surface of the nanoparticle appears to be important to making the catalyst robust toward hydrogen production. In embodiments, all three components are necessary for hydrogen generation that is homogenous for 30+, 75+ days—depending on the conditions.

Example 10. Additional Optimization

An optimization strategy to further increase the rate of hydrogen production and extend the duration of the hydrogen generation process includes one or more of the following:

A. Royal blue lights have resulted in a production rate of 44.1.0 kg hydrogen/mol catalyst/day. Efforts to determine if lower energy/higher wavelength LEDs with dialed up higher intensities will result in comparable or higher rates. In an embodiment, the integrity of the catalyst is preserved and photo-degradation of the sample is avoided to improve durability.

B. Determining alternative proton sources. Acetic acid and ascorbic acid have been introduced to the samples. Other weak acids such as citric acid can be introduced. These sources may exhibit the same or more hydrogen generation capabilities.

C. Analysis of the samples by TEM, ICP-MS, and FTIR. NMR and EPR are other spectroscopic techniques to attempt to best characterize the surface of the nanoparticles. This can be performed for the sample duration to observe and study the changes in the catalyst.

D. Once optimal conditions are analyzed and demonstrated then duration studies can be set up. The upper limit of sample duration can be further investigated.

E. An alternative method of extracting FeMo-co can also be used. A desalting column can be ordered to remove the salt, $Bu_4NBr$. The FeMo-co is extracted into DMF, dimethylformamide. Hydrogen samples can be set up with this form of FeMo-co. The samples may produce at the same or better level of the NMF extracted FeMo-co. This may represent a major step in scaling up the process toward commercialization. (16)

F. Increasing the concentration of the components. $H_2$ generation experiments are possible with increased CdSe-NafY-FeMo-co catalyst concentrations, e.g., 4 µM, 8 µM, 12 µM, 16 µM, 20 µM, 30 µM, 40 µM, 50 µM, or higher.

G. pH changes with sample system. Different buffering systems may be used such as MOPS and PBS. Solubility may vary with pH changes. The capping agent is of the CdSe nanoparticle is mercaptosuccinic acid (MSA). The pKa of the thiol group is 10.64 in MSA (17). If the pH becomes too acidic then enough thiol groups will dissociate from the surface of the nanoparticle and the nanoparticle will precipitate because they are no longer soluble in the aqueous solvent.

H. In embodiments, various temperatures within the range of 16 to 32° C. can be used. In embodiments, agitating the samples may improve hydrogen production.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While specific embodiments of the subject disclosure have been discussed, the above specification is illustrative and not restrictive. Many variations of the disclosure will become apparent to those skilled in the art upon review of this specification. The full scope of the invention should be determined by reference to the claims, along with their full scope of equivalents, and the specification, along with such variations.

INCORPORATION BY REFERENCE

All publications, patents and patent applications cited above are incorporated by reference herein in their entirety for all purposes to the same extent as if each individual publication or patent application were specifically indicated to be so incorporated by reference.

REFERENCES (1) www.popsci.com/how-hydrogen-vehicles-work
(2) www.caranddriver.com/news/honda-fcev-concept-news
(3) https://cafcp.org/blog;
www.cafcp.org/blog/32nd-hydrogen-station-opens-mountain-view-california (4) www.money.cnn.com/2017/09/11/autos/countries-banning-diesel-gas-cars/index.html
(5) Vincent Kylie A.; Parkin, Alison; Armstrong, Fraser A. Investigating and exploiting the electrocatalytic properties of hydrogenase. *Chemical Reviews,* 2007, 107, 4366-4413.
(6) Maxwell, Deborah B. Methods and System for Photoactivated Hydrogen Generation. U.S. Pat. No. 9,605,279. Issued Mar. 28, 2017.
(7) King, Paul. Designing interfaces of hydrogenase-nanoparticle hybrids for efficient solar conversion. *Biochimica et Biophysica Acta,* 2013, 1827, 949-957.
(8) Christiansen J, Goodwin P J, Lanzilotta W N, Seefeldt L C, Dean, D R. Catalytic and biophysical properties of a nitrogenase Apo-MoFe protein produced by a nifB-deletion mutant of *Azotobacter vinelandii.* Biochemistry 1998; 37; 12611-23.
(9) Shah V K, Brill W J. Isolation of an iron-molybdenum cofactor from nitrogenase. Proc Natl Acad Sci USA 1977; 74; 3249-53.
(10) Callan, Callan J F, Mulrooney R C, Kamila S. Luminescent detection of ATP in aqueous solution using positively charged CdSe—ZnS quantum dots. J Fluoresc 2008; 18; 1157-61.
(11) Reisner E, Powell D J, Cavazza C, Fontecilla-Camps J C, Armstrong F A. Visible light-driven $H_2$ production by hydrogenases attached to dye-sensitized $TiO_2$ nanoparticles. J Am Chem Soc 2009; 131; 18457-66.
(12) Wilker, Molly B., Shinopoulos, Katherine E., Brown, Katherine A., Mulder, David W., King, Paul W., Dukovic, Gordana. Electron Kinetics in CdS Nanorod-[FeFe]-Hydrogenase Complexes and Implications for Photochemical H2 Generation. *J Am Chem Soc* 2014, 136, 4316-4324.
(13) Mayhew, S. G. The redox potential of dithionite and SO-2 from equilibrium reactions with flavodoxins, methyl viologen and hydrogen plus hydrogenase. *Eur J Biochem* 1978; 85, 535-547.
(14) Junge, Henrik, Rockstroh, Nils, Fischer, Steffen, Bruckner, Angelika, Ludwig, Ralf, Lochbrunner, Stefan, Kuhn, Oliver, Beller, Matthias. Light to Hydrogen: photocatalytic hydrogen generation from water with molecularly-defined iron complexes. *Inorganics,* 2017, 5, 14, 1-21.
(15) Brown Katherine A., Wilker, Molly B., Boehm, Marko, Dukovic, Gordana, King Paul W. Characterization of photochemical processes for H2 production by CdS nanorod-[FeFe] Hydrogenase complexes. *J Am Chem Soc* 2012; 134, 5627-5636.
(16) McLean, Paul A. Wink, David A. Chapman, Stephen K., Hickman, Alison B., McKillop, Debbie M., Orme-Johnson, William H. A new method for extraction of iron-molybdenum cofactor (FeMoco) from nitrogenase adsorbed to DEAE-cellulose. 1. Effects of anions, cations, and preextraction treatments. Biochemistry, 1989, 28, 9401-9406.
(17) Cheney, Graeme, Fernando, Quintus, Freiser, Henry. Some metal chelates of mercaptosuccinic acid. 1959. Doctoral Thesis. University of Pittsburgh, 2055-2057.
(18) www.hypersolar.com/technology.php
(19) Melis, Anastasios, Happe, Thomas. Hydrogen production: green algae as a source of energy. 2001, Plant Physiology, 2001, 127, 740-748.
(20) Burgess, Barbara, Jacobs, Deloria B., Stiefel, Edward I. Large-scale purification of high activity *Azotobacter vinelandii* nitrogenase. Biochimica et Biophysica Acta, 1980, 614, 196-209.
(21) www.energyfactor.exxonmobil.com/news/algae-heading-farm/?utm_source=Exxon+Newsletter&utm_campaign=cdf2fbe2cc-EMAIL_CAMPAIGN_2018_03_09&utm_medium=email&utm_term=0_591a587b0d-cdf2fbe2cc-86945097

The invention claimed is:

1. A system for photocatalytically producing hydrogen gas, comprising:
   a water soluble cadmium selenide nanoparticle (CdSe) surface capped with mercaptosuccinate (CdSe-MSA); and
   a NafY·FeMo-co complex comprising a NafY protein and an iron-molybdenum cofactor (FeMo-co);
   wherein the CdSe-MSA and NafY·FeMo-co complex are present in about 1:3 to 1:10 molar ratio.

2. The system of claim 1, wherein the CdSe-MSA and the NafY·FeMo-co complex are present in about 1:3, 1:4 or 1:5 molar ratio.

3. The system of claim 1, further comprising sodium dithionite for providing protons and electrons.

4. The system of claim 3, wherein the dithionite salt is provided at a concentration of about 2 mM to 1 M, or about 2-100 mM, or about 2-10 mM.

5. The system of claim 3, further comprising an additional proton source.

6. The system of claim 1, wherein the system is capable of photocatalytically producing hydrogen gas for an extended period of about 5-90 days, 10-72 days or 39-72 days.

7. The system of claim 1, wherein the system is kept under anaerobic conditions.

8. The system of claim 1, wherein the NafY protein is derived from *Azotobacter vinelandii.*

9. The system of claim 1, wherein the FeMo-co is derived from a molybdenum-iron (MoFe) protein.

10. The system of claim 9, wherein the MoFe protein is derived from *Azotobacter vinelandii.*

11. A method for producing hydrogen gas, comprising illuminating the system of claim 1 with a light source having a peak wavelength of about 400-525 nm.

12. The method of claim 11, wherein the peak wavelength is about 425 nm.

13. The method of claim 11, wherein the peak wavelength is about 460 nm.

14. The method of claim 11, wherein the light source has an intensity of about 18,000 to 1,200,000 lux, or about 50,000 to 800,000 lux.

* * * * *